(12) United States Patent
Xia et al.

(10) Patent No.: US 11,736,411 B2
(45) Date of Patent: Aug. 22, 2023

(54) METHOD, DEVICE, AND SYSTEM FOR TRANSMITTING MULTICAST PACKET

(71) Applicant: Huawei Technologies Co., Ltd., Shenzhen (CN)

(72) Inventors: Nu Xia, Nanjing (CN); Jian Chen, Nanjing (CN); Xia Zhu, Nanjing (CN); Jun Zhou, Nanjing (CN); Yihong Huang, Nanjing (CN); Ji Li, Nanjing (CN); Naiwen Wei, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 259 days.

(21) Appl. No.: 17/033,100

(22) Filed: Sep. 25, 2020

(65) Prior Publication Data
US 2021/0014174 A1 Jan. 14, 2021

Related U.S. Application Data

(63) Continuation of application No. PCT/CN2018/124157, filed on Dec. 27, 2018.

(30) Foreign Application Priority Data

Mar. 30, 2018 (CN) .......................... 201810277203.3

(51) Int. Cl.
*H04L 47/80* (2022.01)
*H04L 12/18* (2006.01)
*H04L 45/745* (2022.01)

(52) U.S. Cl.
CPC ........ *H04L 47/806* (2013.01); *H04L 12/1886* (2013.01); *H04L 45/745* (2013.01)

(58) Field of Classification Search
CPC .. H04L 12/1886; H04L 45/745; H04L 47/806
See application file for complete search history.

(56) References Cited

U.S. PATENT DOCUMENTS 7,016,351 B1 * 3/2006 Farinacci ................ H04L 45/16
370/312
7,707,300 B1 * 4/2010 Champagne ............ H04L 45/38
709/231

(Continued)

FOREIGN PATENT DOCUMENTS

CN 1744110 A 3/2006
CN 1889260 A 1/2007

(Continued)

OTHER PUBLICATIONS

Giorgetti, A. et al., "First demonstration of SDN-based Bit Index Explicit Replication (BIER) multicasting", 2017 European Conference on Networks and Communications (EuCNC), Oulu, Finland, Jul. 12-15, 2017, 6 pages.

(Continued)

*Primary Examiner* — Melanie Jagannathan
(74) *Attorney, Agent, or Firm* — Slater Matsil, LLP

(57) ABSTRACT

A method, a device, and a system for transmitting a multicast packet are provided. The method includes: when a device that is in a source subnet and that is connected to a core network receives a multicast packet of a target multicast group, determining addresses of devices that are in a plurality of destination subnets corresponding to the target multicast group and that are connected to the core network, replicating the multicast packet, to obtain a plurality of multicast packets whose quantity is equal to a quantity of the plurality of destination subnets, separately adding outer encapsulation to each multicast packet, and forwarding the multicast packet to which the outer encapsulation is added, where a destination address in the outer encapsulation is an address of a device that is in each destination subnet and that is connected to the core network.

20 Claims, 12 Drawing Sheets

(56) References Cited

U.S. PATENT DOCUMENTS

| | | | | |
|---|---|---|---|---|
| 8,036,221 | B2* | 10/2011 | Fluhrer | H04L 63/0272 370/473 |
| 9,544,240 | B1* | 1/2017 | Przygienda | H04L 12/1863 |
| 10,716,045 | B2* | 7/2020 | Allan | H04W 36/0055 |
| 2003/0018715 | A1* | 1/2003 | O'Neill | H04L 12/189 709/204 |
| 2003/0033426 | A1* | 2/2003 | Beukema | H04L 12/18 709/245 |
| 2003/0053457 | A1* | 3/2003 | Fox | H04L 45/16 370/392 |
| 2004/0022257 | A1* | 2/2004 | Green | H04L 12/4641 370/401 |
| 2007/0032122 | A1 | 2/2007 | Wang | |
| 2010/0106779 | A1* | 4/2010 | Yamauchi | H04L 12/1836 709/227 |
| 2011/0134620 | A1 | 6/2011 | Kang et al. | |
| 2012/0224506 | A1* | 9/2012 | Gredler | H04L 45/124 370/254 |
| 2013/0054526 | A1* | 2/2013 | Di Vincenzo | G06F 16/27 707/634 |
| 2014/0177629 | A1* | 6/2014 | Manula | H04L 49/201 370/390 |
| 2014/0321464 | A1* | 10/2014 | Chang | H04L 12/18 370/390 |
| 2015/0131660 | A1* | 5/2015 | Shepherd | H04L 45/74 370/390 |
| 2015/0139228 | A1 | 5/2015 | Wijnands et al. | |
| 2015/0280928 | A1* | 10/2015 | Tessmer | H04L 12/18 370/390 |
| 2016/0012739 | A1 | 1/2016 | Jafari | |
| 2016/0127139 | A1 | 5/2016 | Tian et al. | |
| 2016/0127142 | A1* | 5/2016 | Tian | H04L 45/50 370/390 |
| 2016/0277291 | A1* | 9/2016 | Lakshmikanthan | H04L 12/465 |
| 2017/0154003 | A1 | 6/2017 | Han et al. | |
| 2017/0222920 | A1* | 8/2017 | Thubert | H04L 45/16 |
| 2018/0287935 | A1* | 10/2018 | Wang | H04L 12/4625 |
| 2018/0316520 | A1* | 11/2018 | Wijnands | H04L 45/50 |
| 2019/0007364 | A1* | 1/2019 | Wang | H04L 61/2521 |
| 2019/0075041 | A1 | 3/2019 | Wang et al. | |
| 2019/0097944 | A1* | 3/2019 | Kotalwar | H04L 12/185 |
| 2019/0116114 | A1 | 4/2019 | Chen et al. | |
| 2019/0123962 | A1* | 4/2019 | Guo | H04L 12/4633 |
| 2019/0165960 | A1* | 5/2019 | Rese | H04L 12/18 |
| 2019/0208011 | A1* | 7/2019 | Dutta | G06F 3/061 |
| 2019/0215175 | A1* | 7/2019 | Mathew | H04L 12/1886 |
| 2020/0344162 | A1* | 10/2020 | Dutta | H04L 47/724 |
| 2021/0092046 | A1 | 3/2021 | Xiong et al. | |

FOREIGN PATENT DOCUMENTS

| | | |
|---|---|---|
| CN | 104811387 A | 7/2015 |
| CN | 106656524 A | 5/2017 |
| CN | 106656794 A | 5/2017 |
| CN | 106982157 A | 7/2017 |
| CN | 107147508 A | 9/2017 |
| CN | 107171977 A | 9/2017 |
| CN | 107204867 A | 9/2017 |
| CN | 107204920 A | 9/2017 |
| CN | 107592262 A | 1/2018 |
| CN | 207965941 U | 10/2018 |
| CN | 109660460 A | 4/2019 |
| CN | 109802914 A | 5/2019 |
| EP | 3252677 A1 | 12/2017 |
| EP | 3429143 A1 | 1/2019 |
| JP | H06224912 A | 8/1994 |
| JP | 2005051548 A | 2/2005 |
| JP | 2012253572 A | 12/2012 |
| WO | 2017059708 A1 | 4/2017 |
| WO | 2017148139 A1 | 9/2017 |
| WO | 2017156966 A1 | 9/2017 |
| WO | 2019029698 A1 | 2/2019 |
| WO | 2019114437 A1 | 6/2019 |

OTHER PUBLICATIONS

Eckert, T. et al., "Traffic Engineering for Bit Index Explicit Replication BIER-TE draft-eckert-bier-te-arch-05", Network Working Group Internet-Draft, Jun. 21, 2017, 28 pages.

Zhu, Y. et al., "BIER-TE Forwarding draft-zcxh-bier-te-forwarding-00.txt", BIER WG Internet-Draft, Sep. 19, 2017, 11 pages.

Wijnands, IJ., et al., "Multicast using Bit Index Explicit Replication draft-ietf-bier-architecture-07", Internet Engineering Task Force Internet-Draft, Jun. 21, 2017, 38 pages.

* cited by examiner

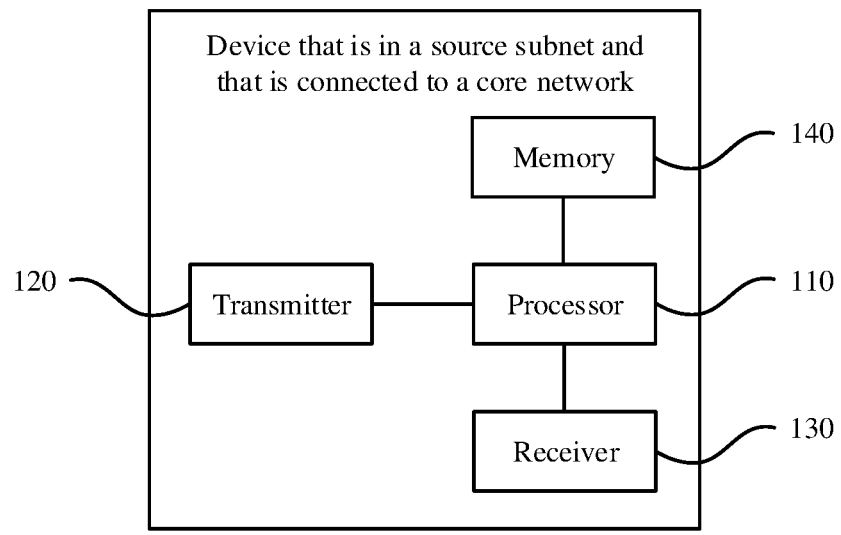
FIG. 1-a
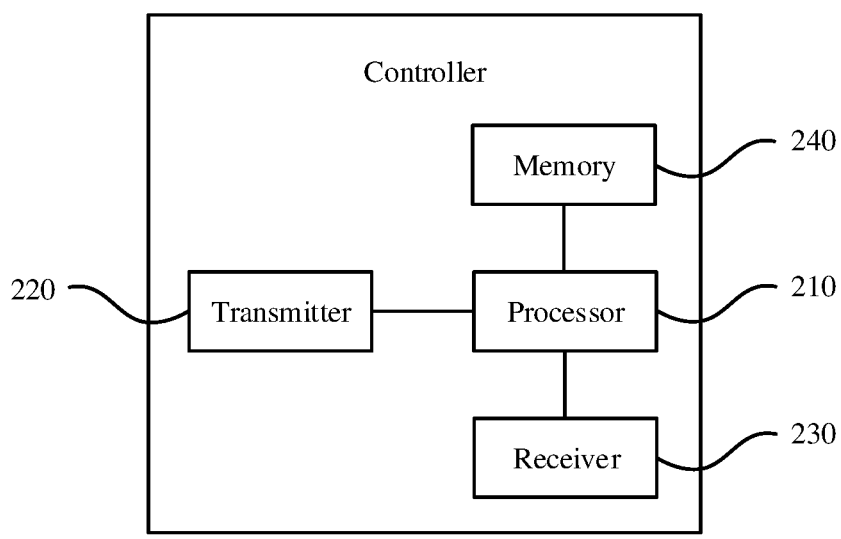
FIG. 1-b

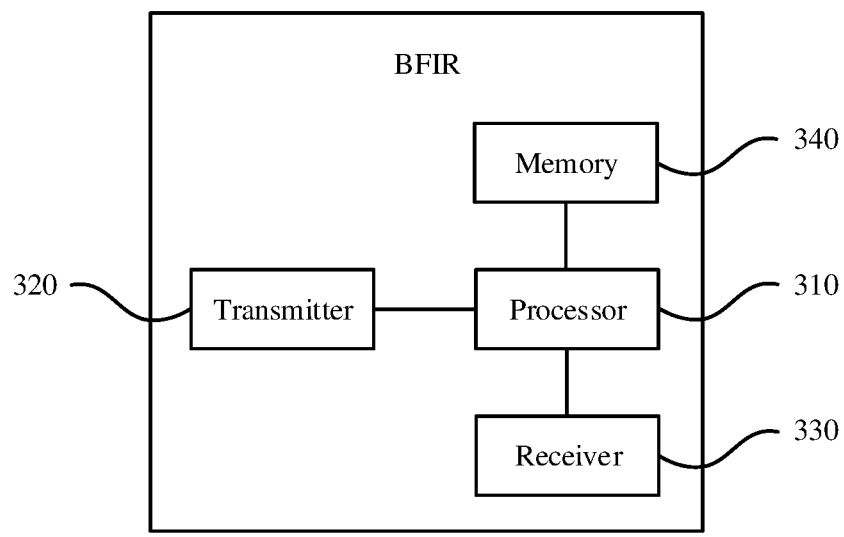
FIG. 1-c
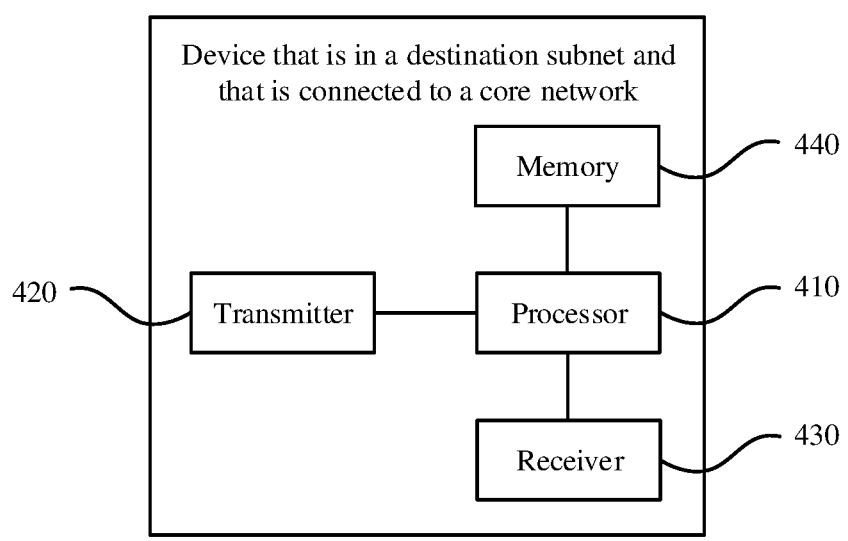
FIG. 1-d

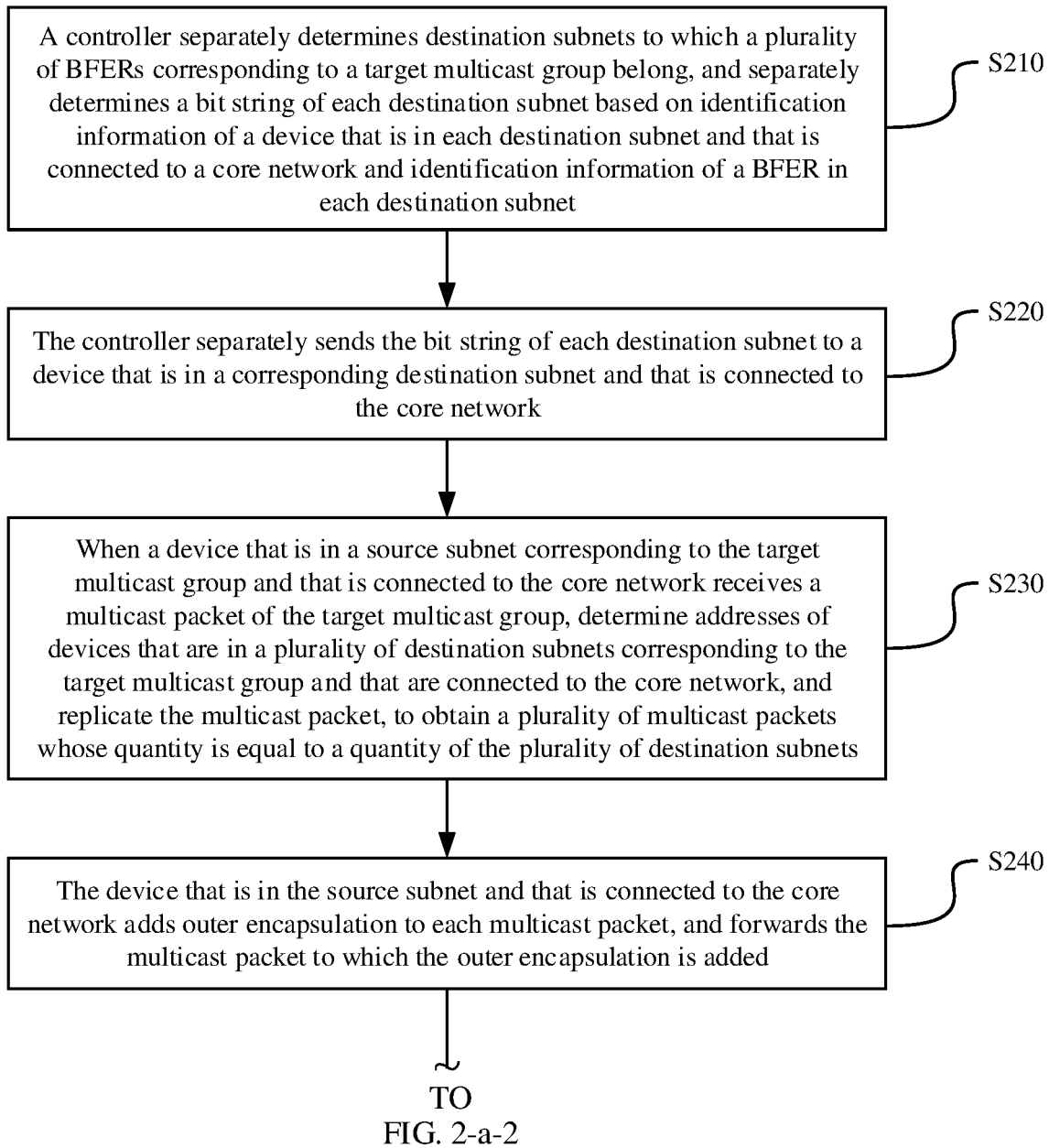

A controller separately determines destination subnets to which a plurality of BFERs corresponding to a target multicast group belong, and separately determines a bit string of each destination subnet based on identification information of a device that is in each destination subnet and that is connected to a core network and identification information of a BFER in each destination subnet ⟵ S210

The controller separately sends the bit string of each destination subnet to a device that is in a corresponding destination subnet and that is connected to the core network ⟵ S220

When a device that is in a source subnet corresponding to the target multicast group and that is connected to the core network receives a multicast packet of the target multicast group, determine addresses of devices that are in a plurality of destination subnets corresponding to the target multicast group and that are connected to the core network, and replicate the multicast packet, to obtain a plurality of multicast packets whose quantity is equal to a quantity of the plurality of destination subnets ⟵ S230

The device that is in the source subnet and that is connected to the core network adds outer encapsulation to each multicast packet, and forwards the multicast packet to which the outer encapsulation is added ⟵ S240

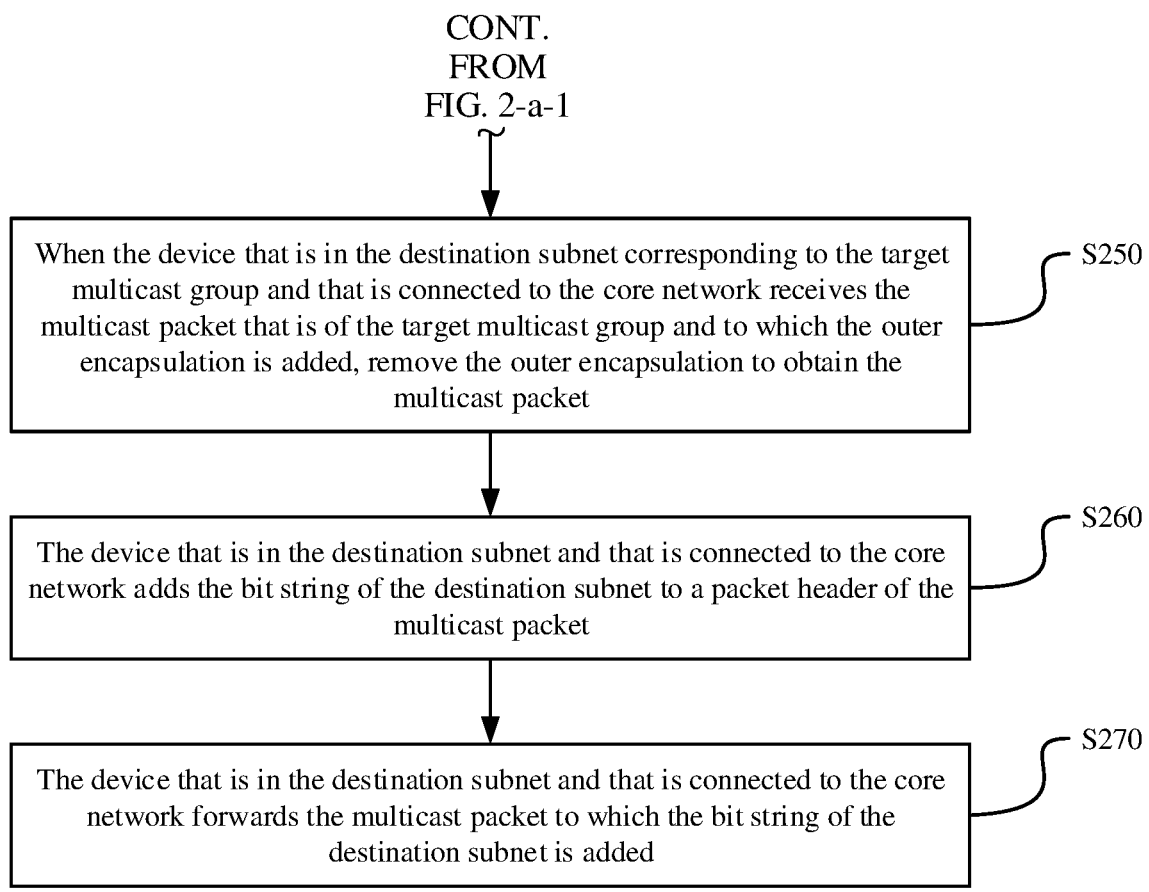
FIG. 2-a-2

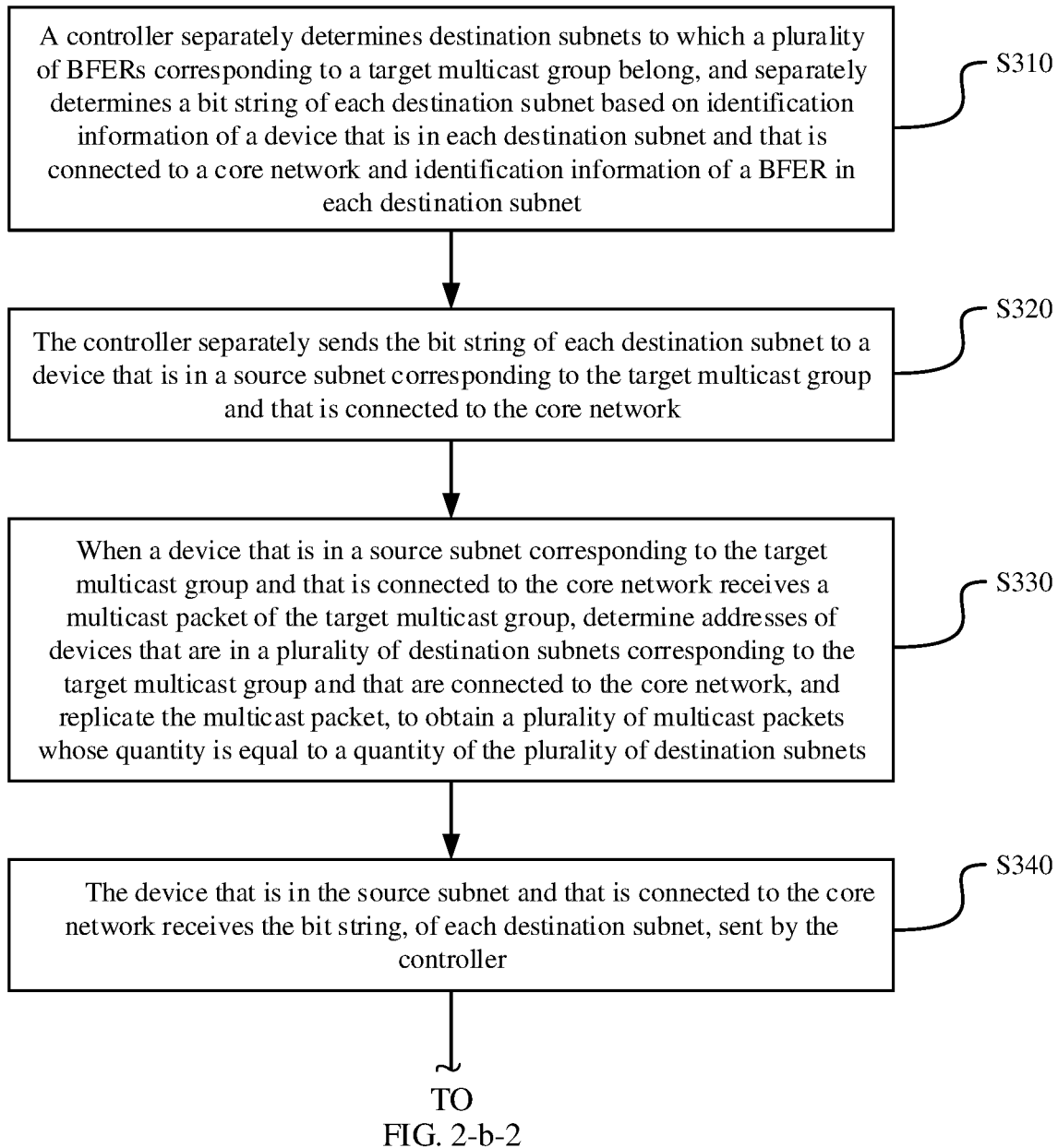
FIG. 2-b-1

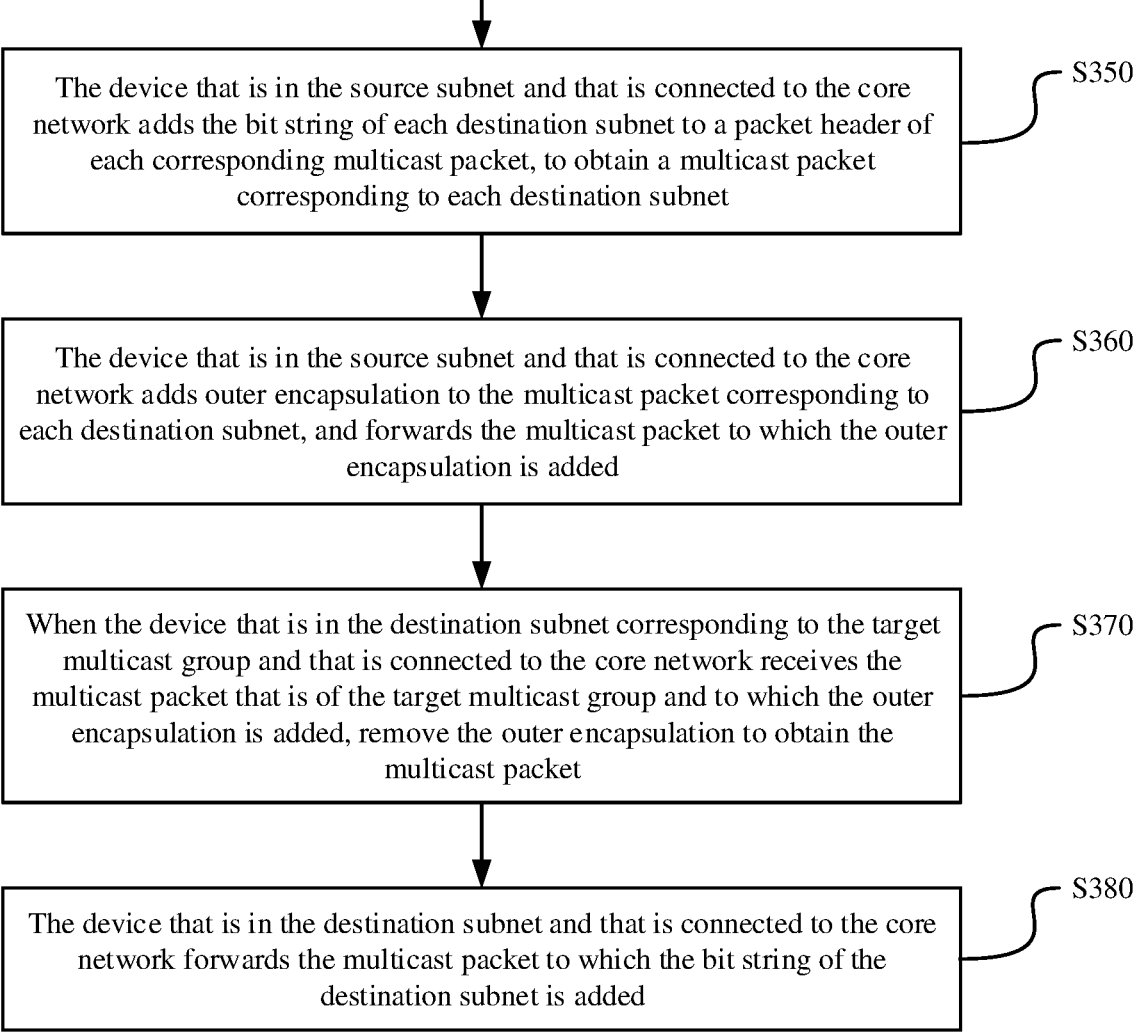
FIG. 2-b-2

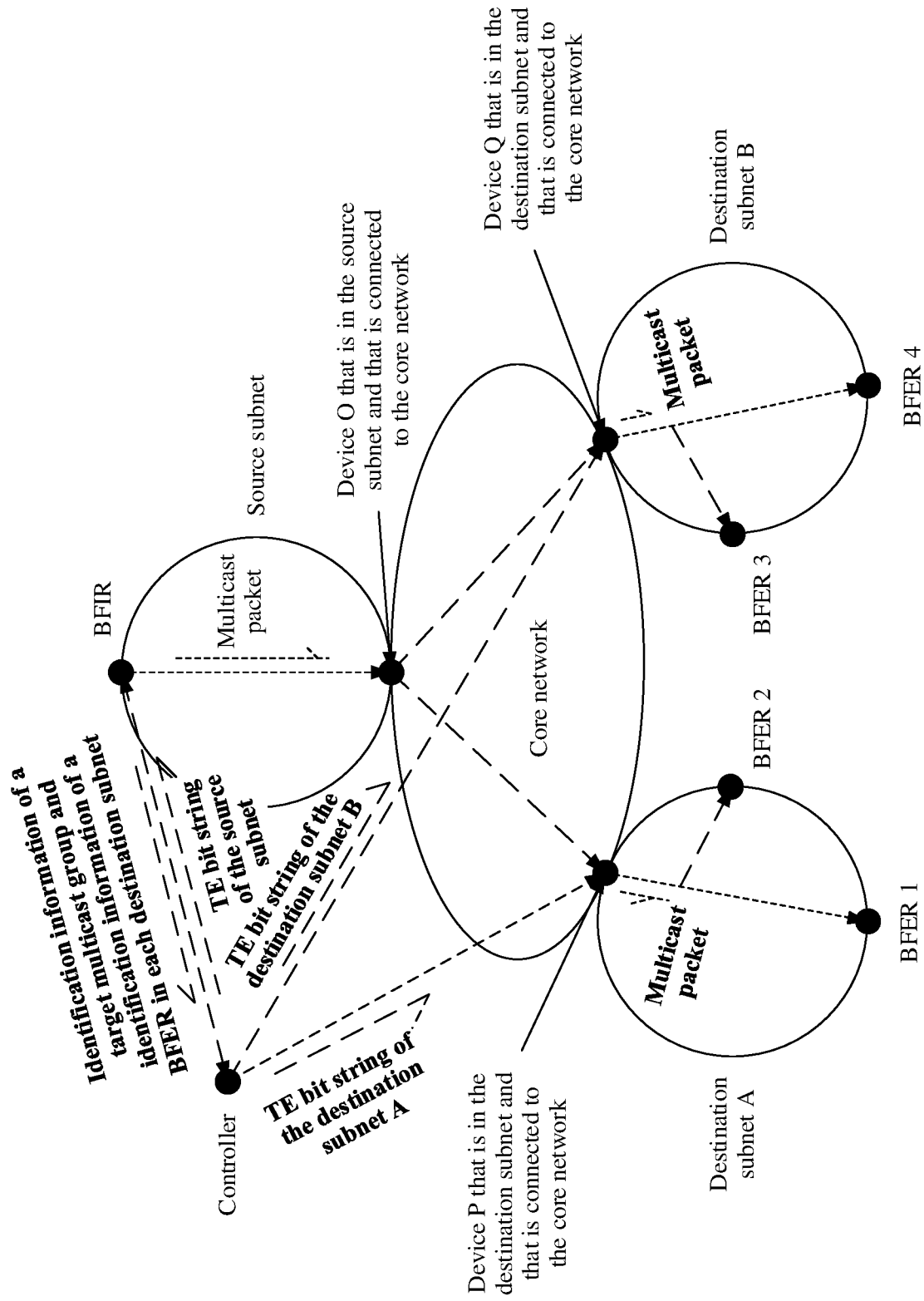
FIG. 4-a

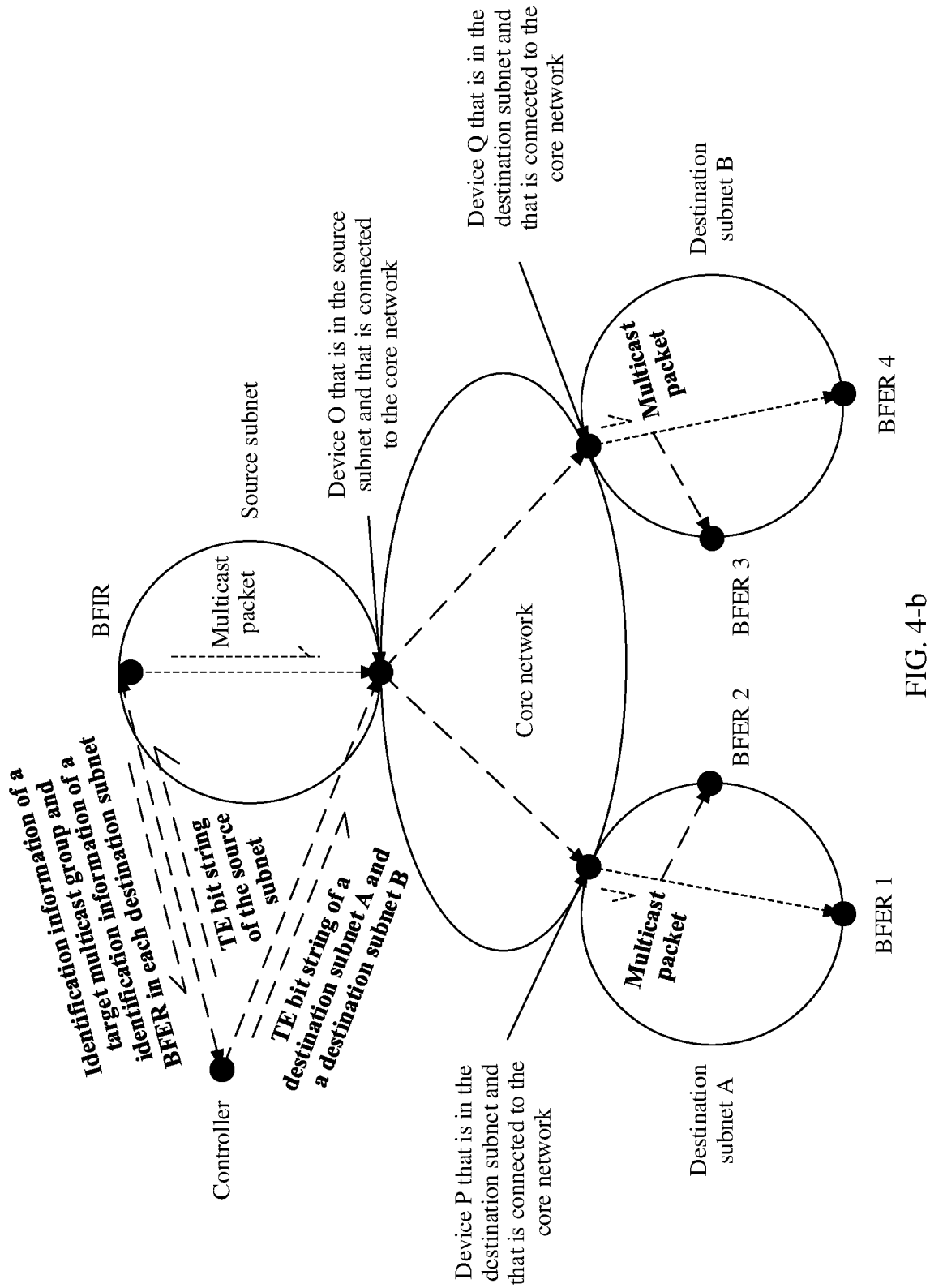
FIG. 4-b

METHOD, DEVICE, AND SYSTEM FOR TRANSMITTING MULTICAST PACKET

CROSS-REFERENCE TO RELATED APPLICATIONS

This application is a continuation of International Application No. PCT/CN2018/124157, filed on Dec. 27, 2018, which claims priority to Chinese Patent Application No. 201810277203.3, filed on Mar. 30, 2018. The disclosures of the aforementioned applications are hereby incorporated by reference in their entireties.

TECHNICAL FIELD

This application relates to the field of electronic technologies, and in particular, to a method, a device, and a system for transmitting a multicast packet.

BACKGROUND

With development of network technologies, network functions become increasingly powerful, and users can watch various live videos on the web. Because the live video is usually watched by a plurality of users at the same time, in other words, live broadcast data sent from a media server needs to be received by the plurality of users, the live broadcast data may be transmitted to a plurality of terminals in a form of a multicast packet.

A data transmission network may include a core network and a subnet, and a plurality of subnets communicate with each other through the core network. Usually, a routing device connected to a source device (usually a media server) that generates a multicast packet is referred to as a source CE (customer edge), and a routing device connected to a destination device (usually a terminal) that receives the multicast packet is referred to as a destination CE. In the data transmission network, a device connected to the source CE may be referred to as a BFIR (bit forwarding ingress router), and a device connected to the destination CE may be referred to as a BFER (bit forwarding egress router). A subnet to which the BFIR belongs is referred to as a source subnet, and a subnet to which the BFER belongs is referred to as a destination subnet.

SUMMARY

In a possible transmission process, when receiving a multicast packet, BFIR determines a quantity N of multicast packets that need to be sent to different destination subnets. The multicast packet is replicated in the BFIR to obtain N multicast packets. The N multicast packets are respectively sent to N different destination subnets. In each destination subnet, the multicast packet is forwarded to a corresponding BFER. Then, the BFER forwards the multicast packet to the destination CE based on a multicast address in the multicast packet.

In the possible transmission process, as information is transmitted through a network in more application scenarios, a quantity of multicast packets that need to be transmitted is also increasing. If each multicast packet is replicated into N multicast packets for transmission, a large quantity of network resources are occupied.

To overcome the problem in the related art, this disclosure provides the following technical solutions.

According to a first aspect of the embodiments of this disclosure, a method for transmitting a multicast packet is provided, where the method is applied to a device that is in a source subnet corresponding to a target multicast group and that is connected to a core network, and the method includes: when a multicast packet of the target multicast group is received, determining addresses of devices that are in a plurality of destination subnets corresponding to the target multicast group and that are connected to the core network, and replicating the multicast packet to obtain a plurality of multicast packets whose quantity is equal to a quantity of the plurality of destination subnets; and separately adding outer encapsulation to each multicast packet, and forwarding the multicast packet to which the outer encapsulation is added, where a destination address in the outer encapsulation is an address of a device that is in each destination subnet and that is connected to the core network.

When receiving the multicast packet, the device that is in the source subnet and that is connected to the core network replicates the multicast packet based on a quantity of destination subnets to which the multicast packet is to be sent, to avoid that a BFIR replicates a plurality of multicast packets when the multicast packet enters a data transmission network at the beginning. In this way, a quantity of multicast packets in the data transmission network can be greatly reduced, and occupation of network resources can be reduced.

In a possible implementation, when a multicast packet of the target multicast group is received, the determining addresses of devices that are in a plurality of destination subnets corresponding to the target multicast group and that are connected to the core network includes: when the multicast packet of the target multicast group is received, determining, based on a preset correspondence between identification information of a destination subnet and an address of a device that is in the destination subnet and that is connected to the core network, and identification information, of the plurality of destination subnets, carried in a packet header of the multicast packet, the addresses of the devices that are in the corresponding plurality of destination subnets and that are connected to the core network.

The BFIR receives identification information (SI information) of the destination subnet from a controller, and adds the SI information to a packet header of the multicast packet. When receiving the multicast packet, the device that is in the source subnet and that is connected to the core network device may read the SI information in the packet header of the multicast packet.

In a possible implementation, when a multicast packet of the target multicast group is received, the determining addresses of devices that are in a plurality of destination subnets corresponding to the target multicast group and that are connected to the core network includes: determining, based on a preset correspondence between a multicast address and an address of a device that is in a destination subnet and that is connected to the core network, addresses of devices that are in a plurality of destination subnets corresponding to a multicast address carried in the multicast packet and that are connected to the core network.

A payload of the multicast packet carries a multicast address, for example, (192.168.1.1, 224.0.1.254), and the addresses of the devices that are in the plurality of destination subnets corresponding to the multicast address carried in the multicast packet and that are connected to the core network can be determined based on the preset correspondence between a multicast address and an address of a device that is in a destination subnet and that is connected to the core network.

In a possible implementation, before the separately adding outer encapsulation to each multicast packet, the method further includes: receiving a traffic engineering TE bit string of each destination subnet sent by a controller; and separately adding the TE bit string of each destination subnet to a packet header of a corresponding multicast packet, to obtain the multicast packet corresponding to each destination subnet.

The TE bit string of each destination subnet can also be added by the BFIR to the packet header of the multicast packet.

In a possible implementation, the separately adding the TE bit string of each destination subnet to a packet header of a corresponding multicast packet, to obtain the multicast packet corresponding to each destination subnet includes: separately replacing a TE bit string, of the source subnet, in the packet header of the corresponding multicast packet with the TE bit string of each destination subnet, to obtain the multicast packet corresponding to each destination subnet.

The packet header of the multicast packet may carry the TE bit string of the source subnet, where the TE bit string is used to indicate how the multicast packet is forwarded in the source subnet. However, when the multicast packet arrives at the device that is in the source subnet and that is connected to the core network and is about to enter the core network through the device that is in the source subnet and that is connected to the core network, the TE bit string, of the source subnet, originally carried in the packet header of the multicast packet is useless. Therefore, in the device that is in the source subnet and that is connected to the core network, the TE bit string, of the source subnet, in the packet header of the corresponding multicast packet may be separately replaced with the TE bit string, of each destination subnet, received from the controller, to obtain the multicast packet corresponding to each destination subnet.

According to a second aspect of the embodiments of this disclosure, a method for transmitting a multicast packet is provided, where the method is applied to a controller, and the method includes: separately determining destination subnets to which a plurality of bit forwarding egress routers BFERs corresponding to a target multicast group belong, and separately determining a TE bit string of each destination subnet based on identification information of a device that is in each destination subnet and that is connected to a core network and identification information of a BFER in each destination subnet; and separately sending the TE bit string of each destination subnet to a device that is in the corresponding destination subnet and that is connected to the core network, or a device that is in a source subnet corresponding to the target multicast group and that is connected to the core network.

In a possible implementation, the method further includes: determining a TE bit string of the source subnet based on identification information of a bit forwarding ingress router BFIR corresponding to the target multicast group and identification information of at least one device that is in the source subnet and that is connected to the core network; and sending the TE bit string of the source subnet to the BFIR.

In a possible implementation, if at least one BFER in the BFERs corresponding to the target multicast group belongs to the source subnet, the determining a TE bit string of the source subnet based on identification information of a BFIR corresponding to the target multicast group and identification information of at least one device that is in the source subnet and that is connected to the core network includes: determining the TE bit string of the source subnet based on the identification information of the BFIR corresponding to the target multicast group, the identification information of the at least one device that is in the source subnet and that is connected to the core network, and identification information of the at least one BFER.

In a possible implementation, the method further includes: sending identification information of each destination subnet to the BFIR.

According to a third aspect of the embodiments of this disclosure, a method for transmitting a multicast packet is provided, where the method is applied to a BFIR, and the method includes: receiving identification information, of each destination subnet corresponding to a target multicast group, sent by a controller; and when a multicast packet of the target multicast group is received, adding the identification information of each destination subnet to a packet header of the multicast packet, and forwarding, in a multicast manner, the multicast packet to which the identification information of each destination subnet is added.

In a possible implementation, the method further includes: receiving a TE bit string, of a source subnet corresponding to the target multicast group, sent by the controller; and when a multicast packet of the target multicast group is received, the adding the identification information of each destination subnet to a packet header of the multicast packet, and forwarding, in a multicast manner, the multicast packet to which the identification information of each destination subnet is added includes: when the multicast packet of the target multicast group is received, adding the TE bit string and the identification information of each destination subnet to the packet header of the multicast packet, and forwarding the multicast packet to which the TE bit string and the identification information of each destination subnet are added.

According to a fourth aspect of the embodiments of this disclosure, a method for transmitting a multicast packet is provided, where the method is applied to a device that is in a destination subnet corresponding to a target multicast group and that is connected to a core network, and the method includes: when a multicast packet that is of the target multicast group and to which outer encapsulation is added is received, removing the outer encapsulation to obtain the multicast packet; adding a bit string of the destination subnet to a packet header of the multicast packet; and forwarding the multicast packet to which the bit string of the destination subnet is added.

In a possible implementation, the bit string is a TE bit string, and before the adding a bit string of the destination subnet to a packet header of the multicast packet, the method further includes: receiving the TE bit string, of the destination subnet, sent by a controller.

In a possible implementation, the adding a bit string of the destination subnet to a packet header of the multicast packet includes: replacing a bit string, of a source subnet corresponding to the target multicast group, in the packet header of the multicast packet with the bit string of the destination subnet.

According to a fifth aspect of the embodiments of this disclosure, a device that is in a source subnet corresponding to a target multicast group and that is connected to a core network is provided. The device includes at least one module, and the at least one module is configured to implement the method for transmitting a multicast packet provided in the first aspect.

According to a sixth aspect of the embodiments of this disclosure, a controller is provided. The controller includes at least one module, and the at least one module is configured to implement the method for transmitting a multicast packet provided in the second aspect.

According to a seventh aspect of the embodiments of this disclosure, a BFIR is provided. The BFIR includes at least one module, and the at least one module is configured to implement the method for transmitting a multicast packet provided in the third aspect.

According to an eighth aspect of the embodiments of this disclosure, a device that is in a destination subnet corresponding to a target multicast group and that is connected to a core network is provided. The device includes at least one module, and the at least one module is configured to implement the method for transmitting a multicast packet provided in the fourth aspect.

According to a ninth aspect of the embodiments of this disclosure, a system for transmitting a multicast packet is provided, where the system includes a BFIR and a device that is in a source subnet corresponding to a target multicast group and that is connected to a core network; the BFIR is configured to: when a multicast packet of the target multicast group is received, forward the multicast packet in a multicast manner; and the device that is in the source subnet and that is connected to the core network is configured to: when the multicast packet is received, determine addresses of devices that are in a plurality of destination subnets corresponding to the target multicast group and that are connected to the core network, replicate the multicast packet, to obtain a plurality of multicast packets whose quantity is equal to a quantity of the plurality of destination subnets, separately add outer encapsulation to each multicast packet, and forward the multicast packet to which the outer encapsulation is added, where a destination address in the outer encapsulation is an address of a device that is in each destination subnet and that is connected to the core network.

In a possible implementation, the system further includes a controller; the controller is configured to send identification information of each destination subnet corresponding to the target multicast group to the BFIR; the BFIR is further configured to add the identification information of each destination subnet to a packet header of the multicast packet; and the device that is in the source subnet and that is connected to the core network is configured to: when the multicast packet is received, determine, based on a preset correspondence between identification information of a destination subnet and an address of a device that is in the destination subnet and that is connected to the core network, and identification information, of the plurality of destination subnets, carried in the packet header of the multicast packet, the addresses of the devices that are in the corresponding plurality of destination subnets and that are connected to the core network.

In a possible implementation, the system further includes a device that is in a destination subnet corresponding to the target multicast group and that is connected to the core network; the controller is further configured to: separately determine destination subnets to which a plurality of BFERs corresponding to the target multicast group belong; separately determine a bit string of each destination subnet based on identification information of the device that is in each destination subnet and that is connected to the core network and identification information of a BFER in each destination subnet; and send the bit string of each destination subnet to the device that is in the corresponding destination subnet and that is connected to the core network; and the device that is in the destination subnet and that is connected to the core network is configured to: when the multicast packet to which the outer layer encapsulation is added is received, remove the outer layer encapsulation to obtain the multicast packet; add the bit string of the destination subnet to the packet header of the multicast packet; and forward the multicast packet to which the bit string of the destination subnet is added.

In a possible implementation, the controller is further configured to determine a bit string of the source subnet based on identification information of a BFIR corresponding to the target multicast group and identification information of at least one device that is in the source subnet and that is connected to the core network, and send the bit string of the source subnet to the BFIR; and the BFIR is further configured to: receive the bit string, of the source subnet, sent by the controller; when the multicast packet is received, add the bit string of the source subnet and the identification information of each destination subnet to the packet header of the multicast packet; and forward the multicast packet to which the bit string of the source subnet and the identification information of each destination subnet are added.

According to a tenth aspect of the embodiments of this disclosure, a device that is in a source subnet corresponding to a target multicast group and that is connected to a core network is provided, where the device includes a processor, a memory, a receiver, and a transmitter; the processor is configured to: when a multicast packet of the target multicast group is received, determine addresses of devices that are in a plurality of destination subnets corresponding to the target multicast group and that are connected to the core network, replicate the multicast packet, to obtain a plurality of multicast packets whose quantity is equal to a quantity of the plurality of destination subnets, and separately add outer encapsulation to each multicast packet; the transmitter is configured to forward the multicast packet to which the outer layer encapsulation is added, where a destination address in the outer layer encapsulation is an address, of a device that is in each destination subnet and that is connected to the core network, stored in the memory.

In a possible implementation, the processor is configured to: when the receiver receives the multicast packet of the target multicast group, determine, based on a preset correspondence between identification information of a destination subnet and an address of a device that is in the destination subnet and that is connected to the core network, and identification information, of the plurality of destination subnets, carried in a packet header of the multicast packet, the addresses of the devices that are in the corresponding plurality of destination subnets and that are connected to the core network.

In a possible implementation, the processor is configured to: determine, based on a preset correspondence that is stored in the memory and that is between a multicast address and an address of a device that is in a destination subnet and that is connected to the core network, addresses of devices that are in a plurality of destination subnets corresponding to a multicast address carried in the multicast packet and that are connected to the core network.

In a possible implementation, the receiver is further configured to receive a TE bit string, of each destination subnet, sent by the controller; and the processor is further configured to separately add the TE bit string of each destination subnet to a packet header of a corresponding multicast packet, to obtain the multicast packet corresponding to each destination subnet.

In a possible implementation, the processor is configured to: separately replace a TE bit string, of the source subnet, in the packet header of the corresponding multicast packet with the TE bit string of each destination subnet, to obtain the multicast packet corresponding to each destination subnet.

According to an eleventh aspect of the embodiments of this disclosure, a controller is provided, where the controller includes a processor and a transmitter; the processor is configured to separately determine destination subnets to which a plurality of BFERs corresponding to a target multicast group belong, and separately determine a TE bit string of each destination subnet based on identification information of a device that is in each destination subnet and that is connected to a core network and identification information of a BFER in each destination subnet; and the transmitter is configured to separately send the TE bit string of each destination subnet to a device that is in the corresponding destination subnet and that is connected to the core network, or a device that is in a source subnet corresponding to the target multicast group and that is connected to the core network.

In a possible implementation, the processor is further configured to determine a TE bit string of the source subnet based on identification information of a BFIR corresponding to the target multicast group and identification information of at least one device that is in the source subnet and that is connected to the core network; and the transmitter is further configured to send the TE bit string of the source subnet to the BFIR.

In a possible implementation, when at least one BFER in the BFERs corresponding to the target multicast group belongs to the source subnet, the processor is configured to: determine the TE bit string of the source subnet based on the identification information of the BFIR corresponding to the target multicast group, the identification information of the at least one device that is in the source subnet and that is connected to the core network, and identification information of the at least one BFER.

In a possible implementation, the transmitter is further configured to: send identification information of each destination subnet to the BFIR.

According to a twelfth aspect of the embodiments of this disclosure, a BFIR is provided, where the BFIR includes a processor, a memory, a receiver, and a transmitter; the receiver is configured to receive identification information, of each destination subnet corresponding to a target multicast group, sent by a controller; the processor is configured to: store, in the memory, the identification information, of each destination subnet, received by the receiver, and when the receiver receives a multicast packet of the target multicast group, add, to a packet header of the multicast packet, the identification information of each destination subnet stored in the memory; and the transmitter is configured to forward, in a multicast manner, the multicast packet to which the identification information of each destination subnet is added.

In a possible implementation, the receiver is further configured to receive a TE bit string, of a source subnet corresponding to the target multicast group, sent by the controller; the processor is configured to: when the multicast packet of the target multicast group is received, add the TE bit string and the identification information of each destination subnet to the packet header of the multicast packet; and the transmitter is configured to forward the multicast packet to which the TE bit string and the identification information of each destination subnet are added.

According to a thirteenth aspect of the embodiments of this disclosure, a device that is in a destination subnet corresponding to a target multicast group and that is connected to a core network is provided, where the device includes a processor, a memory, a receiver, and a transmitter; the processor is configured to: when the receiver receives a multicast packet that is of the target multicast group and to which outer encapsulation is added, remove the outer encapsulation to obtain the multicast packet, and add a bit string, of the destination subnet, stored in the memory to a packet header of the multicast packet; and the transmitter is configured to forward the multicast packet to which the bit string of the destination subnet is added.

In a possible implementation, the bit string is a TE bit string, and the receiver is further configured to: receive the TE bit string, of the destination subnet, sent by a controller.

In a possible implementation, the processor is configured to: replace a bit string, of a source subnet corresponding to the target multicast group, in the packet header of the multicast packet with the bit string of the destination subnet.

According to a fourteenth aspect of the embodiments of this disclosure, a computer-readable storage medium including an instruction is provided. When the computer-readable storage medium runs on a device that is in a source subnet corresponding to a target multicast group and that is connected to a core network, the device is enabled to perform the method in the first aspect.

According to a fifteenth aspect of the embodiments of this disclosure, a computer program product including an instruction is provided. When the computer program product runs on a device that is in a source subnet corresponding to a target multicast group and that is connected to a core network, the device is enabled to perform the method in the first aspect.

According to a sixteenth aspect of the embodiments of this disclosure, a computer-readable storage medium is provided, including an instruction. When the computer-readable storage medium runs on a controller, the controller is enabled to perform the method according to the second aspect.

According to a seventeenth aspect of the embodiments of this disclosure, a computer program product including an instruction is provided. When the computer program product runs on a controller, the controller is enabled to perform the method in the second aspect.

According to an eighteenth aspect of the embodiments of this disclosure, a computer-readable storage medium is provided, including an instruction. When the computer-readable storage medium runs on a BFIR, the BFIR is enabled to perform the method according to the third aspect.

According to a nineteenth aspect of the embodiments of this disclosure, a computer program product including an instruction is provided. When the computer program product runs on a BFIR, the BFIR is enabled to perform the method according to the third aspect.

According to a twentieth aspect of the embodiments of this disclosure, a computer-readable storage medium including an instruction is provided. When the computer-readable storage medium runs on a device that is in a destination subnet corresponding to a target multicast group and that is connected to a core network, the device is enabled to perform the method in the fourth aspect.

According to a twenty-first aspect of the embodiments of this disclosure, a computer program product including an instruction is provided. When the computer program product runs on a device that is in a destination subnet corresponding to a target multicast group and that is connected to a core network, the device is enabled to perform the method in the fourth aspect.

The technical solutions provided in the embodiments of this disclosure may include the following beneficial effects.

In the embodiments of this disclosure, when a device that is in a source subnet and that is connected to a core network receives a multicast packet of a target multicast group, addresses of devices that are in a plurality of destination subnets corresponding to the target multicast group and that are connected to the core network are determined, the multicast packet is replicated, to obtain a plurality of multicast packets whose quantity is equal to a quantity of the plurality of destination subnets, outer encapsulation is separately added to each multicast packet, and the multicast packet to which the outer encapsulation is added is forwarded. A destination address in the outer encapsulation is an address of a device that is in each destination subnet and that is connected to the core network. In this way, when receiving the multicast packet, the device that is in the source subnet and that is connected to the core network replicates the multicast packet based on a quantity of destination subnets to which the multicast packet is to be sent, to avoid that a BFIR replicates a plurality of multicast packets when the multicast packet enters a data transmission network at the beginning. In this way, a quantity of multicast packets in a data transmission network can be greatly reduced, and occupation of network resources can be reduced.

It should be understood that the foregoing general descriptions and the following detailed descriptions are merely illustrative and explanatory, and are not intended to limit this disclosure.

BRIEF DESCRIPTION OF THE DRAWINGS

The accompanying drawings herein are incorporated in the specification, become a part of the specification, show embodiments that are in accordance with this disclosure, and are used with the specification to explain a principle of this disclosure. In the drawings:

FIG. 1-*a* is a schematic structural diagram of a device that is in a source subnet and that is connected to a core network according to an example embodiment;

FIG. 1-*b* is a schematic structural diagram of a controller according to an example embodiment;

FIG. 1-*c* is a schematic structural diagram of a BFIR according to an example embodiment;

FIG. 1-*d* is a schematic structural diagram of a device that is in a destination subnet and that is connected to a core network according to an example embodiment;

FIG. 2-*a*-1 and FIG. 2-*a*-2 are schematic flowcharts of a method for transmitting a multicast packet according to an example embodiment;

FIG. 2-*b*-1 and FIG. 2-*b*-2 are schematic flowcharts of a method for transmitting a multicast packet according to an example embodiment;

FIG. 4-*a* is a schematic flowchart of a method for transmitting a multicast packet according to an example embodiment;

FIG. 4-*b* is a schematic flowchart of a method for transmitting a multicast packet according to an example embodiment;

Figure 3:
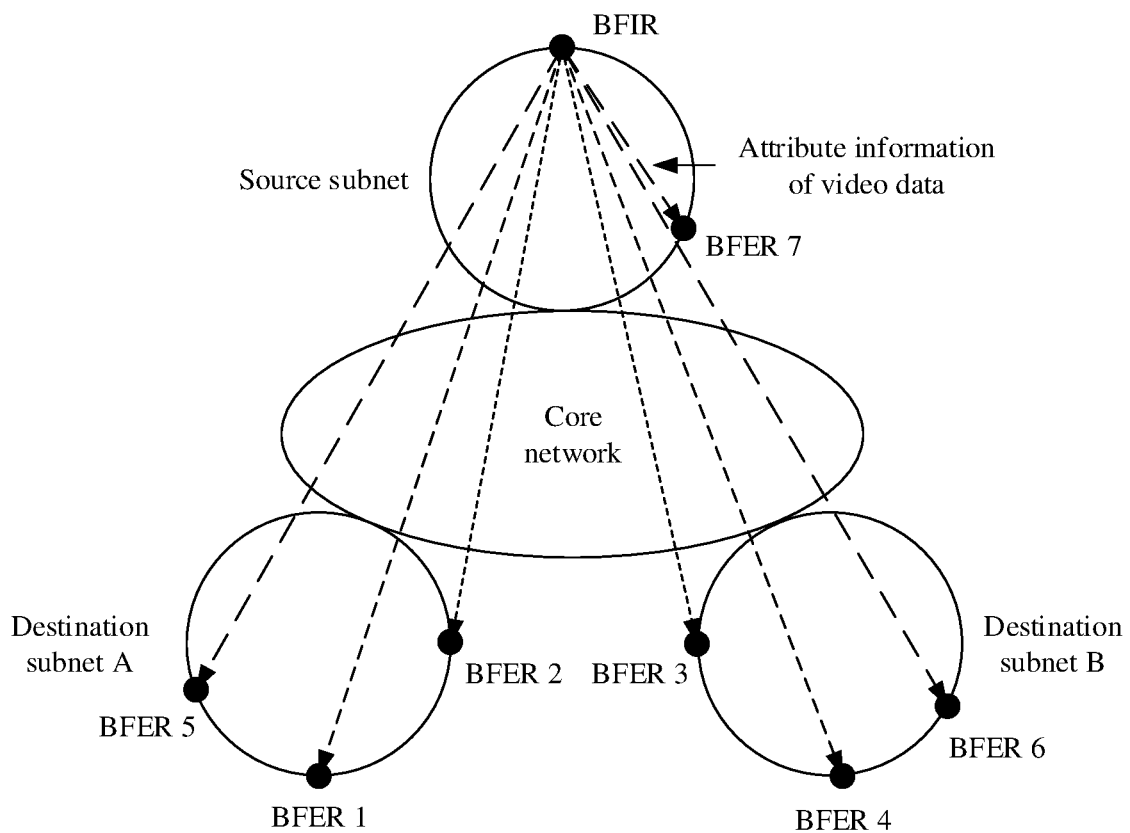
FIG. 3 is a schematic diagram of broadcasting attribute information of recorded video data to all BFERs by a BFIR according to an example embodiment.

The foregoing accompanying drawings show specific embodiments of this disclosure, and more detailed descriptions are provided in the following. The accompanying drawings and text descriptions are not intended to limit the scope of the idea of this disclosure in any manner, but are intended to describe the concept of this disclosure to a person skilled in the art with reference to particular embodiments.

DETAILED DESCRIPTION OF ILLUSTRATIVE EMBODIMENTS

Example embodiments are described in detail herein, and examples of the example embodiments are presented in the accompanying drawings. When the following description relates to the accompanying drawings, unless specified otherwise, same numbers in different accompanying drawings represent a same or similar element. Implementations described in the following example embodiments do not represent all implementation manners consistent with this disclosure. On the contrary, they are only examples of apparatuses and methods that are described in the appended claims in detail and that are consistent with some aspects of this disclosure.

The embodiments of the present invention provide a method for transmitting a multicast packet. The method may be jointly implemented by a device that is in a source subnet corresponding to a target multicast group and that is connected to a core network, a controller, and a BFIR, and a device that is in a destination subnet corresponding to the target multicast group and that is connected to the core network.

The device that is in the source subnet corresponding to the target multicast group and that is connected to the core network may include a processor no, a transmitter 120, and a receiver 130. The receiver 130 and the transmitter 120 may be separately connected to the processor no, as shown in FIG. 1-*a*. The receiver 130 may be configured to receive a message or data. The transmitter 120 and the receiver 130 may be network interface cards. The transmitter 120 may be configured to send a message or data, in other words, may forward a multicast packet to which outer encapsulation is added. The device that is in the source subnet and that is connected to the core network may further include an acceleration component (which may be referred to as an accelerator). When the acceleration component is a network acceleration component, the acceleration component may be a network interface card. The processor no may be a control center of a device that is in the source subnet and that is connected to the core network, and is connected to various parts of an entire source server through various interfaces and lines, for example, the receiver 130 and the transmitter 120. In the present invention, the processor no may be a CPU (central processing unit), and may be configured to determine addresses of devices that are in a plurality of destination subnets corresponding to the target multicast group and that are connected to the core network. Optionally, the processor no may include one or more processing units. The processor no may integrate an application processor and a modem processor. The application processor mainly processes an operating system, and the modem processor mainly processes wireless communication. The processor no may alternatively be a digital signal processor, an application-specific integrated circuit, a field programmable gate array, another programmable logic device, or the like. The device that is in the source subnet and that is connected to the core network may further include a memory 140. The memory 140 may be configured to store a software program and a module. The processor no reads software code and the module that are stored in the memory, to perform various function applications and data processing of the device that is in the source subnet and that is connected to the core network.

The controller may include a processor 210, a transmitter 220, and a receiver 230. The receiver 230 and the transmitter 220 may be separately connected to the processor 210, as shown in FIG. 1-*b*. The receiver 230 may be configured to receive a message or data. The transmitter 220 and the receiver 230 may be network interface cards. The transmitter 220 may be configured to send a message or data, in other words, may separately send a TE (traffic engineering) bit string of each destination subnet to a device that is in a corresponding destination subnet and that is connected to the core network, or the device that is in the source subnet corresponding to the target multicast group and that is connected to the core network. The controller may further include an acceleration component (which may be referred to as an accelerator). When the acceleration component is a network acceleration component, the acceleration component may be a network interface card. The processor 210 may be a control center of the controller, and connects all parts of an entire source server through various interfaces and lines, such as the receiver 230 and the transmitter 220. In the present invention, the processor 210 may be a CPU, and may be configured to separately determine destination subnets to which a plurality of bit forwarding egress routers BFERs corresponding to the target multicast group belong, and separately determine a TE bit string of each destination subnet based on identification information of a device that is in each destination subnet and that is connected to the core network and identification information of a BFER in each destination subnet. Optionally, the processor 210 may include one or more processing units, and the processor 210 may integrate an application processor and a modem processor. The application processor mainly processes an operating system, and the modem processor mainly processes wireless communication. The processor 210 may alternatively be a digital signal processor, an application-specific integrated circuit, a field programmable gate array, another programmable logic device, or the like. The controller may further include a memory 240. The memory 240 may be configured to store a software program and a module, and the processor 210 performs various function applications and data processing of the controller by reading software code and the module stored in the memory.

The BFIR may include a processor 310, a transmitter 320, and a receiver 330. The receiver 330 and the transmitter 320 may be separately connected to the processor 310, as shown in FIG. 1-*c*. The receiver 330 may be configured to receive a message or data. The transmitter 320 and the receiver 330 may be network interface cards. The transmitter 320 may be configured to send a message or data, in other words, may forward a multicast packet to which the identification information of each destination subnet is added. The BFIR may further include an acceleration component (which may be referred to as an accelerator). When the acceleration component is a network acceleration component, the acceleration component may be a network interface card. The processor 310 may be a control center of the BFIR, and connects all parts of an entire source server through various interfaces and lines, such as the receiver 330 and the transmitter 320. In the present invention, the processor 310 may be a CPU, and may be configured to: when the multicast packet of the target multicast group is received, add the identification information of each destination subnet to a packet header of the multicast packet. Optionally, the processor 310 may include one or more processing units. The processor 310 may integrate an application processor and a modem processor. The application processor mainly processes an operating system, and the modem processor mainly processes wireless communication. The processor 310 may alternatively be a digital signal processor, an application-specific integrated circuit, a field programmable gate array, another programmable logic device, or the like. The BFIR may further include a memory 340. The memory 340 may be configured to store a software program and a module, and the processor 310 performs various function applications and data processing of the BFIR by reading software code and the module stored in the memory.

The device that is in the destination subnet corresponding to the target multicast group and that is connected to the core network may include a processor 410, a transmitter 420, and a receiver 430. The receiver 430 and the transmitter 420 may be separately connected to the processor 410, as shown in FIG. 1-*d*. The receiver 430 may be configured to receive a message or data. The transmitter 420 and the receiver 430 may be network interface cards. The transmitter 420 may be configured to send a message or data, in other words, may forward a multicast packet to which a bit string of the destination subnet is added. The device that is in the destination subnet and that is connected to the core network may further include an acceleration component (which may be referred to as an accelerator). When the acceleration component is a network acceleration component, the acceleration component may be a network interface card. The processor 410 may be a control center of the device that is in the destination subnet and that is connected to the core network, and is connected to various parts of an entire source server through various interfaces and lines, for example, the receiver 430 and the transmitter 420. In the present invention, the processor 410 may be a CPU, and may be configured to: when a multicast packet of the target multicast group to which outer encapsulation is added is received, remove the outer encapsulation to obtain the multicast packet. Optionally, the processor 410 may include one or more processing units. The processor 410 may integrate an application processor and a modem processor. The application processor mainly processes an operating system, and the modem processor mainly processes wireless communication. The processor 410 may alternatively be a digital signal processor, an application-specific integrated circuit, a field programmable gate array, another programmable logic device, or the like. The device that is in the destination subnet and that is connected to the core network may further include a memory 440. The memory 440 may be configured to store a software program and a module. The processor 410 reads software code and the module that are stored in the memory, to perform various function applications and data processing of the device that is in the destination subnet and that is connected to the core network.

An example embodiment of this disclosure provides a method for transmitting a multicast packet. As shown in FIG. 2-a-1 and FIG. 2-a-2, the method may be applied to a device that is in a source subnet corresponding to a target multicast group and that is connected to a core network, a controller, a BFIR, and a device that is in a destination subnet corresponding to the target multicast group and that is connected to the core network. The method may include the following steps.

Step S210: The controller separately determines destination subnets to which a plurality of BFERs corresponding to the target multicast group belong, and separately determines a bit string of each destination subnet based on identification information of a device that is in each destination subnet and that is connected to the core network and identification information of a BFER in each destination subnet.

The bit string may be a TE bit string. The identification information of the device that is in each destination subnet and that is connected to the core network, identification information of a port, and the identification information of the BFER in each destination subnet may be sequence number information. A unique sequence number (unique sequence number in a subnet) may be configured for an edge device in the source subnet and a forwarding port of a device that belongs to the source subnet. The sequence number is important in representation of the TE bit string.

During implementation, the controller may separately determine the destination subnets to which the plurality of BFERs corresponding to the target multicast group belong, and may determine the TE bit string of each destination subnet based on the identification information of the device that is in each destination subnet and that is connected to the core network, the identification information of the port, and the identification information of the BFER in each destination subnet.

Before the controller performs the foregoing operations, first, if a media server is a server of a television station, when the television station records a program and performs live broadcasting on the web, the media server may obtain recorded video data. Then, the media server may send attribute information of the recorded video data to a BFIR connected to the media server. As shown in FIG. 3, the BFIR broadcasts the attribute information of the recorded video data to all BFERs. A user can choose whether to watch the recorded program. If the user is interested in the recorded program, the user can choose to watch the recorded program. A BFER connected to a terminal may feed back information that the user is interested to a BFIR that queries the BFER connected to the terminal. It should be noted that, in the foregoing process, the BFIR and the BFER may interact with each other through BGP (border gateway protocol) information. Further, the BFIR may determine a relationship between the recorded video data (corresponding to a target multicast group) and a receiver, in other words, the BFER. One target multicast group may be interested in by a plurality of receivers. The plurality of receivers may be from different destination subnets or a same destination subnet. The plurality of receivers may alternatively belong to the source subnet in which the BFIR is located. Each time a preset period expires, the BFIR may send identification information of the target multicast group and the identification information of the BFER in each destination subnet to the controller. Alternatively, the BFIR may send, to the controller, a request for determining the TE bit string of each destination subnet. The request carries the identification information (an address of the multicast group) of the target multicast group and the identification information (a sequence number) of the BFER in each destination subnet. In this way, the controller can perform the operation in the step S210.

In addition to the foregoing manner, the BFER may not feed back the information that the user is interested to the BFIR, but directly feed back the information that the user is interested to the controller. In this way, the controller can perform the operation in the step S210.

The controller knows which BFER is interested in the target multicast group, and the controller may further prestore a topology diagram of an entire network, including the source subnet, the core network, and the destination subnet. In this way, the controller may determine the destination subnets to which the plurality of BFERs corresponding to the target multicast group belong. Each destination subnet has at least one device connected to the core network, and the controller may prestore the destination subnet, identification information of a device that is in the destination subnet and that is connected to the core network, and the identification information of the port. In this way, the controller may determine the identification information of the device that is in each destination subnet and that is connected to the core network. The controller determines the TE bit string of each destination subnet based on the identification information of the device that is in each destination subnet and that is connected to the core network, the identification information of the port, and identification information of the BFER corresponding to the target multicast group. In other words, the controller knows the topology diagram of the entire network, and a start location and a target location at which the target multicast group is forwarded, and then the controller may determine the TE bit string of each destination subnet according to a policy such as TE or a differentiated service policy.

The TE bit string may be used to indicate a specific path for forwarding the multicast packet in the target multicast group. If there is no TE bit string, the multicast packet in the target multicast group can only be forwarded based on a routing table maintained at a bottom layer of a router. The TE bit string may be a TE bit string in a draft of T. Eckert (T. Eckert), and a number of the draft is "draft-eckert-bier-TE-arch-05". In addition to the TE bit string, the controller may further separately determine a bit string of each destination subnet. The bit string may be a bit string proposed in a draft numbered "draft-IETF-bier-architecture-07".

Optionally, if at least one BFER in the BFERs corresponding to the target multicast group belongs to the source subnet, the step S210 may include: The controller determines a TE bit string of the source subnet based on identification information of the BFIR corresponding to the target multicast group, identification information of at least one device that is in the source subnet and that is connected to the core network, and identification information of the at least one BFER.

During implementation, one target multicast group may be interested in by a plurality of receivers. The plurality of receivers may be from different destination subnets or a same destination subnet. The plurality of receivers may alternatively belong to the source subnet in which the BFIR is located. If the at least one BFER in the BFERs corresponding to the target multicast group belongs to the source subnet, the TE bit string of each destination subnet needs to be determined, and the TE bit string of the source subnet needs to be determined.

In the foregoing manner, the controller may determine the TE bit string, of each destination subnet, required for forwarding when the multicast packet of the target multicast group arrives at the destination subnet. When the at least one BFER in BFERs corresponding to the target multicast group belongs to the source subnet, the controller may further determine the TE bit string, of the source subnet, required for forwarding when the multicast packet of the target multicast group is in the source subnet.

Optionally, the method provided in this embodiment of this disclosure further includes: determining, by the controller, the TE bit string of the source subnet based on the identification information of the BFIR corresponding to the target multicast group and the identification information of the at least one device that is in the source subnet and that is connected to the core network, and sending the TE bit string of the source subnet to the BFIR.

During implementation, in addition to forwarding the multicast packet in the destination subnet by using the TE bit string, the multicast packet may also be forwarded in the source subnet by using the TE bit string. It should be noted that there are many devices in the source subnet and the destination subnet, and a path is relatively complex. In this case, a TE policy that facilitates processing a complex case may be used to calculate a forwarding path of the multicast packet. In addition, the TE policy can be used to automatically identify a quantity of destination subnets to which the multicast packet is sent. If the destination subnet is a subnet, the packet can be forwarded in a unicast manner. When the quantity of destination subnets is greater than or equal to 2, the multicast packet may be forwarded in a multicast manner. In other words, the multicast packet is replicated only when there is a branch node in a process of transmitting the multicast packet, and the replicated multicast packet is sent through different egress nodes. In this way, a quantity of packets in a data transmission network can be greatly reduced.

Similar to a manner of determining the TE bit string of each destination subnet, the controller may further determine the TE bit string of the source subnet. Details are not described herein.

Step S220: The controller separately sends the bit string of each destination subnet to the device that is in the corresponding destination subnet and that is connected to the core network.

During implementation, the controller may separately send the TE bit string of each destination subnet to the device that is in the corresponding destination subnet and that is connected to the core network, or the device that is in the source subnet corresponding to the target multicast group and that is connected to the core network. In this way, the device that is in the destination subnet and that is connected to the core network or the device that is in the source subnet corresponding to the target multicast group and that is connected to the core network may use the obtained TE bit string of the destination subnet. As shown in FIG. 4-a, the controller separately sends the TE bit string of each destination subnet to a device P and a device Q that are in the corresponding destination subnet and that are connected to the core network. As shown in FIG. 4-b, the controller separately sends the TE bit string of each destination subnet to a device O that is in the source subnet corresponding to the target multicast group and that is connected to the core network.

Optionally, the method provided in this embodiment of this disclosure may further include: sending, by the controller, identification information of each destination subnet to the BFIR.

During implementation, the identification information of the destination subnet may be SI (set identification) information. The controller may generate the SI information. The SI information may be a bit string corresponding to a sequence number of the destination subnet. Then, the controller may send the SI information to the BFIR. In this way, the BFIR may add the SI information to a packet header of the multicast packet, and the device that is in the source subnet and that is connected to the core network and that subsequently receives the multicast packet may determine, based on the SI information, a quantity of multicast packets to be replicated and to be sent to different destination subnets. In addition to this manner, the device that is in the source subnet and that is connected to the core network may further determine, in another manner, the quantity of multicast packets to be replicated, which is described in detail in the following.

Optionally, the method provided in this embodiment of this disclosure further includes: receiving, by the BFIR, identification information, of each destination subnet corresponding to the target multicast group, sent by the controller.

During implementation, the identification information of the destination subnet may be the SI information. The BFIR may add the SI information to the packet header of the multicast packet, and the device that is in the source subnet and that is connected to the core network and that subsequently receives the multicast packet may determine, based on the SI information, the quantity of multicast packets to be replicated and to be sent to different destination subnets.

Optionally, the method provided in this embodiment of this disclosure further includes: when the BFIR receives the multicast packet of the target multicast group, adding the identification information of each destination subnet to the packet header of the multicast packet, and forwarding, in a multicast manner, the multicast packet to which the identification information of each destination subnet is added.

During implementation, the BFIR may first store the identification information of each destination subnet, and when the multicast packet of the target multicast group arrives, add the identification information of each destination subnet to the packet header of the multicast packet. Optionally, the packet header of the multicast packet may be extended, and the identification information of each destination subnet is added to an extension location in the packet header of the multicast packet. In this way, the identification information of the destination subnet has a location in the packet header, and may carry more information.

Each data bit in the SI information may be set to represent a sequence number of a destination subnet. For example, 8-bit SI information can represent eight destination subnets. When the SI information is "00001010", it may indicate that destination subnets are a destination subnet 2 and a destination subnet 4. This is because data bits of the destination subnet 2 and the destination subnet 4 are set to 1.

Then, the BFIR may forward, in the multicast manner, the multicast packet to which the identification information of each destination subnet is added. Specifically, the BFIR may search the routing table for a next hop address corresponding to the target multicast group, and forward, based on the found address, the multicast packet to which the identification information of each destination subnet is added.

Optionally, the method provided in this embodiment of this disclosure may further include: receiving, by the BFIR, a TE bit string, of the source subnet corresponding to the target multicast group, sent by the controller. The step of "when the BFIR receives the multicast packet of the target multicast group, adding the identification information of each destination subnet to the packet header of the multicast packet, and forwarding, in a multicast manner, the multicast packet to which the identification information of each destination subnet is added" may include: when the BFIR receives the multicast packet of the target multicast group, adding the TE bit string and the identification information of each destination subnet to the packet header of the multicast packet, forwarding the multicast packet to which the TE bit string and the identification information of each destination subnet are added.

During implementation, in addition to a manner of forwarding the multicast packet through the routing table, the multicast packet may also be forwarded based on the TE bit string. First, the BFIR may receive the TE bit string, of the source subnet corresponding to the target multicast group, sent by the controller. Then, when receiving the multicast packet of the target multicast group, the BFIR may add the TE bit string and the identification information of each destination subnet to the packet header of the multicast packet, and forward the multicast packet to which the TE bit string and the identification information of each destination subnet are added.

Optionally, the TE bit string and the identification information of each destination subnet may occupy 64, 128, 256, 512, 1024, 2048, and 4096 data bits in the packet header in total, which can be set based on an actual requirement.

During implementation, a management domain (including the source subnet and all destination subnets) can support a maximum of 65535 port numbers (specified by a protocol). Therefore, if each subnet is allocated with 64 port numbers, in other words, the TE bit string is 64 data bits. In this case, the SI information needs to be expressed by 1024 (65535 divided by 64) data bits. By analogy, if the TE bit string is 128, 256, 512, 1024, and 2048 data bits respectively, correspondingly, the number of data bits occupied by the SI information is 512, 256, 128, 64, and 32 bits.

Figure 5:
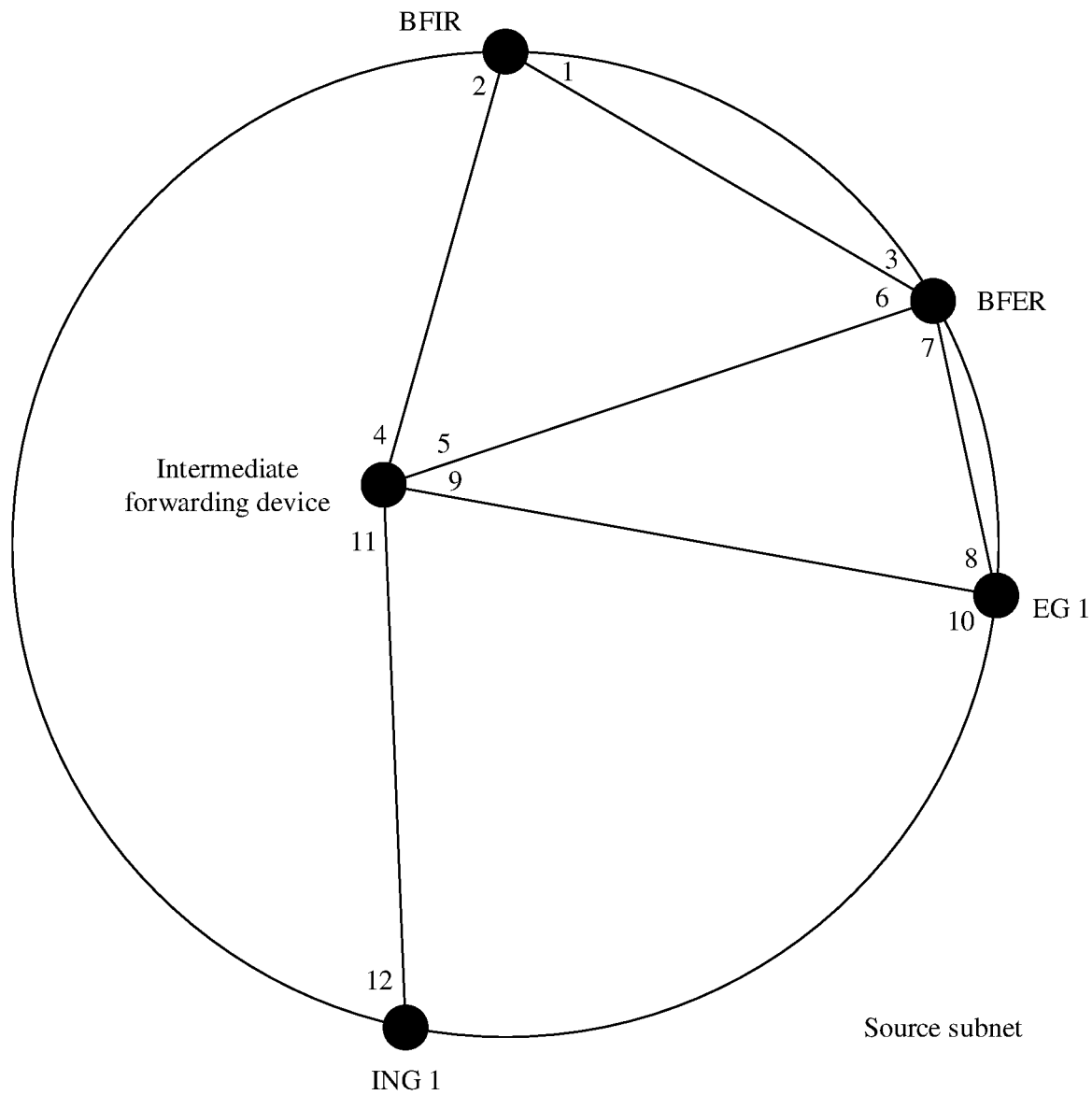
FIG. 5 is a schematic diagram of a port of a device in a source subnet according to an example embodiment.

As shown in FIG. 5, a network shown in FIG. 5 is the source subnet. In the network, there is one BFIR, one BFER, one intermediate forwarding device, and two devices that are in the source subnet and that are connected to the core network. A port ING 1 exists in one device that is in the source subnet and that is connected to the core network, and is configured to forward a multicast packet of the source subnet to the core network. A port EG 1 exists in the other device that is in the source subnet and that is connected to the core network, and is configured to forward a multicast packet in the core network to the source subnet. In FIG. 5, numbers represent port numbers of different devices. If the multicast packet needs to be forwarded from the BFIR to the BFER and the device that is in the source subnet and that is connected to the core network, the multicast packet is forwarded through the ING 1 of the device that is in the source subnet and that is connected to the core network. In this case, the port numbers that the multicast packet passes through are 3, 4, and 12 (only an ingress port needs to be marked). A corresponding TE bit string is 100000001100. The TE bit string shows that the third, fourth, and twelfth bits are set to 1, indicating that the multicast packet needs to be forwarded by these ports.

The BFIR has two ports, namely, a port 1 and a port 2. A port 3 is connected to the port 1 and a port 4 is connected to the port 2. When the multicast packet is transmitted to the BFIR, the BFIR finds that the multicast packet needs to enter a next device through two ports connected to the BFIR, and the BFIR replicates the multicast packet into two copies. The first multicast packet is transmitted from the port 1 to the port 3. The second multicast packet is transmitted from the port 2 to the port 4. By analogy, the branch node can always replicate the multicast packet into n copies when determining to send the received multicast packet to n different devices.

Step S230: When the device that is in the source subnet corresponding to the target multicast group and that is connected to the core network receives the multicast packet of the target multicast group, determine addresses of devices that are in a plurality of destination subnets corresponding to the target multicast group and that are connected to the core network, and replicate the multicast packet, to obtain a plurality of multicast packets whose quantity is equal to a quantity of the plurality of destination subnets.

During implementation, a quantity of different destination subnets to which the multicast packet needs to be sent may be determined. If the multicast packet needs to be sent to m different destination subnets, the multicast packet is replicated into m copies. The quantity of destination subnets may be specifically determined based on SI information in the packet header of the multicast packet.

Optionally, the step S230 may include: when receiving the multicast packet of the target multicast group, the device that is in the source subnet and that is connected to the core network determines, based on a preset correspondence between the identification information of the destination subnet and an address of the device that is in the destination subnet and that is connected to the core network, and identification information, of the plurality of destination subnets, carried in the packet header of the multicast packet, the addresses of the devices that are in the corresponding plurality of destination subnets and that are connected to the core network.

During implementation, the BFIR receives the identification information (SI information) of the destination subnet from the controller, and adds the SI information to the packet header of the multicast packet. When receiving the multicast packet, the device that is in the source subnet and that is connected to the core network device may read the SI information in the packet header of the multicast packet. The device that is in the source subnet and that is connected to the core network may pre-establish a correspondence between the identification information of the destination subnet and the address of the device that is in the destination subnet and that is connected to the core network, as shown in Table 1.

TABLE 1

| Identification information of the destination subnet | Address of the device that is in the destination subnet and that is connected to the core network |
| --- | --- |
| 2 | IP EG 2 |
| 3 | IP EG 3 |
| 4 | IP EG 4 |

Optionally, the step S230 may include: The device that is in the source subnet and that is connected to the core network determines, based on a preset correspondence between a multicast address and the address of the device that is in the destination subnet and that is connected to the core network, the addresses of the devices that are in the plurality of destination subnets corresponding to the multicast address carried in the multicast packet and that are connected to the core network.

During implementation, a payload of the multicast packet carries a multicast address, for example, (192.168.1.1, 224.0.1.254), and the addresses of the devices that are in the plurality of destination subnets corresponding to the multicast address carried in the multicast packet and that are connected to the core network can be determined based on the preset correspondence between a multicast address and the address of the device that is in the destination subnet and that is connected to the core network. Alternatively, identification information of the plurality of destination subnets corresponding to the multicast address carried in the multicast packet may be determined based on a preset correspondence between the multicast address and the identification information of the destination subnet. The addresses of the devices that are in the plurality of destination subnets corresponding to the identification information of the plurality of destination subnets and that are connected to the core network are separately determined based on a preset correspondence between the identification information of the destination subnet and the address of the device that is in the destination subnet and that is connected to the core network.

Step S240: The device that is in the source subnet and that is connected to the core network adds outer encapsulation to each multicast packet, and forwards the multicast packet to which the outer encapsulation is added.

A destination address in the outer encapsulation is an address of the device that is in each destination subnet and that is connected to the core network.

During implementation, the multicast packet can be forwarded in the destination subnet or source subnet according to the TE policy. On the core network, the multicast packet can be forwarded in the unicast manner. The reason is that a quantity of devices on the core network is small and a forwarding path is relatively simple, and unicast can meet a forwarding requirement.

In this way, the multicast packet is sent, in the device that is in the source subnet and that is connected to the core network, to the device that is in the destination subnet and that is connected to the core network in the unicast manner. After the address of the device that is in the destination subnet and that is connected to the core network is determined, for example, an IP (internet protocol) address, the multicast packet may be encapsulated in a form of unicast such as GRE (generic routing encapsulation) or MPLS (multi-protocol label switching). The device that is in the source subnet and that is connected to the core network forwards the multicast packet to which the outer encapsulation is added.

Step S250: When the device that is in the destination subnet corresponding to the target multicast group and that is connected to the core network receives the multicast packet that is of the target multicast group and to which the outer encapsulation is added, remove the outer encapsulation to obtain the multicast packet.

During implementation, the multicast packet is unicast from the device O that is in the source subnet and that is connected to the core network to the device that is in the destination subnet and that is connected to the core network. The device that is in the destination subnet and that is connected to the core network may remove the outer encapsulation of the multicast packet, in other words, remove the GRE encapsulation or the MPLS encapsulation.

Step S260: The device that is in the destination subnet and that is connected to the core network adds the bit string of the destination subnet to the packet header of the multicast packet.

During implementation, as shown in FIG. 4-a, the device that is in the destination subnet and that is connected to the core network may add, to the packet header of the multicast packet, the bit string, of the destination subnet, received from the controller.

Optionally, before the bit string of the destination subnet is added to the packet header of the multicast packet, the method provided in this embodiment of this disclosure further includes: receiving, by the device that is in the destination subnet and that is connected to the core network, the TE bit string, of the destination subnet, sent by the controller.

Step S260 may include: The device that is in the destination subnet and that is connected to the core network replaces the bit string of the source subnet corresponding to the target multicast group in the packet header of the multicast packet with the bit string of the destination subnet.

During implementation, when the multicast packet arrives, the device that is in the destination subnet and that is connected to the core network obtains the multicast address from the payload of the multicast packet. The target multicast group is determined based on the multicast address, and then a pre-received correspondence between a multicast group and the bit string of the destination subnet may be queried, as shown in Table 2, to determine the bit string of the destination subnet corresponding to the target multicast group.

TABLE 2

| Multicast address | TE bit string of the destination subnet |
|---|---|
| G1 | 00001010 |
| G2 | 00101010 |
| G3 | 11100010 |

Step S270: The device that is in the destination subnet and that is connected to the core network forwards the multicast packet to which the bit string of the destination subnet is added.

During implementation, as in the source subnet, the multicast packet is forwarded by using the TE bit string of the source subnet, the multicast packet may also be forwarded by using the TE bit string of the destination subnet in the destination subnet. As shown in FIG. 4-a, the multicast packet is forwarded to a BFER 1 and a BFER 2 in a destination subnet A. In a destination subnet B, the multicast packet is forwarded to a BFER 3 and a BFER 4. Then, the BFER 1, the BFER 2, the BFER 3, and the BFER 4 respectively forward the multicast packet to a CE device, until the CE device forwards the multicast packet to the terminal.

In the embodiments of this disclosure, when the device that is in the source subnet and that is connected to the core network receives the multicast packet of the target multicast group, the addresses of devices that are in the plurality of destination subnets corresponding to the target multicast group and that are connected to the core network are determined, the multicast packet is replicated, to obtain the plurality of multicast packets whose quantity is equal to the quantity of the plurality of destination subnets, the outer encapsulation is separately added to each multicast packet, and the multicast packet to which the outer encapsulation is added is forwarded. The destination address in the outer encapsulation is the address of the device that is in each destination subnet and that is connected to the core network. In this way, when receiving the multicast packet, the device that is in the source subnet and that is connected to the core network replicates the multicast packet based on a quantity of destination subnets to which the multicast packet is to be sent, to avoid that a BFIR replicates a plurality of multicast packets when the multicast packet enters a data transmission network at the beginning. In this way, a quantity of multicast packets in a data transmission network can be greatly reduced, and occupation of network resources can be reduced.

An example embodiment of this disclosure provides a method for transmitting a multicast packet. As shown in FIG. 2-b-1 and FIG. 2-b-2, the method may be applied to a device that is in a source subnet corresponding to a target multicast group and that is connected to a core network, a controller, a BFIR, and a device that is in a destination subnet corresponding to the target multicast group and that is connected to the core network. The method may include the following steps.

Step S310: The controller separately determines destination subnets to which a plurality of BFERs corresponding to the target multicast group belong, and separately determines a bit string of each destination subnet based on identification information of a device that is in each destination subnet and that is connected to the core network and identification information of a BFER in each destination subnet.

The bit string may be a TE bit string. The identification information of the device that is in each destination subnet and that is connected to the core network, and the identification information of the BFER in each destination subnet may be sequence number information. A unique sequence number (unique sequence number in a subnet) may be configured for an edge device in the source subnet and a forwarding port of a device that belongs to the source subnet. The sequence number is important in representation of the TE bit string.

Optionally, if at least one BFER in the BFERs corresponding to the target multicast group belongs to the source subnet, the step S210 may include: The controller determines a TE bit string of the source subnet based on identification information of the BFIR corresponding to the target multicast group, identification information of at least one device that is in the source subnet and that is connected to the core network, and identification information of the at least one BFER.

Optionally, the method provided in this embodiment of this disclosure further includes: determining, by the controller, the TE bit string of the source subnet based on the identification information of the BFIR corresponding to the target multicast group and the identification information of the at least one device that is in the source subnet and that is connected to the core network, and sending the TE bit string of the source subnet to the BFIR.

Step S320: The controller separately sends the bit string of each destination subnet to the device that is in the source subnet corresponding to the target multicast group and that is connected to the core network.

Optionally, the method provided in this embodiment of this disclosure may further include: sending, by the controller, identification information of each destination subnet to the BFIR.

Optionally, the method provided in this embodiment of this disclosure further includes: receiving, by the BFIR, identification information, of each destination subnet corresponding to the target multicast group, sent by the controller.

Optionally, the method provided in this embodiment of this disclosure further includes: when the BFIR receives the multicast packet of the target multicast group, adding the identification information of each destination subnet to the packet header of the multicast packet, and forwarding, in a multicast manner, the multicast packet to which the identification information of each destination subnet is added.

Optionally, the method provided in this embodiment of this disclosure may further include: receiving, by the BFIR, a TE bit string, of the source subnet corresponding to the target multicast group, sent by the controller. The step of "when the BFIR receives the multicast packet of the target multicast group, adding the identification information of each destination subnet to the packet header of the multicast packet, and forwarding, in a multicast manner, the multicast packet to which the identification information of each destination subnet is added" may include: when the BFIR receives the multicast packet of the target multicast group, adding the TE bit string and the identification information of each destination subnet to the packet header of the multicast packet, forwarding the multicast packet to which the TE bit string and the identification information of each destination subnet are added.

Step S330: When the device that is in the source subnet corresponding to the target multicast group and that is connected to the core network receives the multicast packet of the target multicast group, determine addresses of devices that are in a plurality of destination subnets corresponding to the target multicast group and that are connected to the core network, and replicate the multicast packet, to obtain a plurality of multicast packets whose quantity is equal to a quantity of the plurality of destination subnets.

Optionally, the step S330 may include: when receiving the multicast packet of the target multicast group, the device that is in the source subnet and that is connected to the core network determines, based on a preset correspondence between the identification information of the destination subnet and an address of the device that is in the destination subnet and that is connected to the core network, and identification information, of the plurality of destination subnets, carried in the packet header of the multicast packet, the addresses of the devices that are in the corresponding plurality of destination subnets and that are connected to the core network.

Optionally, the step S330 may include: The device that is in the source subnet and that is connected to the core network determines, based on a preset correspondence between a multicast address and the address of the device that is in the destination subnet and that is connected to the core network, the addresses of the devices that are in the plurality of destination subnets corresponding to the multicast address carried in the multicast packet and that are connected to the core network.

Step S340: The device that is in the source subnet and that is connected to the core network receives the bit string, of each destination subnet, sent by the controller.

Step S350: The device that is in the source subnet and that is connected to the core network adds the bit string of each destination subnet to the packet header of each corresponding multicast packet, to obtain a multicast packet corresponding to each destination subnet.

During implementation, the TE bit string of each destination subnet can also be added by the BFIR to the packet header of the multicast packet.

Optionally, the step S350 may include: Replace the TE bit string of the source subnet in the packet header of each corresponding multicast packet with the TE bit string of the destination subnet, to obtain the multicast packet corresponding to each destination subnet.

During implementation, the packet header of the multicast packet may carry the TE bit string of the source subnet, where the TE bit string is used to indicate how the multicast packet is forwarded in the source subnet. However, when the multicast packet arrives at the device that is in the source subnet and that is connected to the core network and is about to enter the core network through the device that is in the source subnet and that is connected to the core network, the TE bit string, of the source subnet, originally carried in the packet header of the multicast packet is useless. Therefore, as shown in FIG. 4-*b*, in the device that is in the source subnet and that is connected to the core network, the TE bit string, of the source subnet, in the packet header of the corresponding multicast packet may be separately replaced with the TE bit string, of each destination subnet, received from the controller, to obtain the multicast packet corresponding to each destination subnet.

Certainly, a replacement operation may also be performed in other devices instead of the device that is in the source subnet and that is connected to the core network. Assuming that the device that is in the source subnet and that is connected to the core network only replicates the multicast packet and does not add the TE bit string of each destination subnet to the packet header of the multicast packet, the device that is in the destination subnet and that is connected to the core network can add the TE bit string of each destination subnet to the packet header of the multicast packet.

Step S360: The device that is in the source subnet and that is connected to the core network adds outer encapsulation to the multicast packet corresponding to each destination subnet, and forwards the multicast packet to which the outer encapsulation is added.

A destination address in the outer encapsulation is an address of the device that is in each destination subnet and that is connected to the core network.

Step S370: When the device that is in the destination subnet corresponding to the target multicast group and that is connected to the core network receives the multicast packet that is of the target multicast group and to which the outer encapsulation is added, remove the outer encapsulation to obtain the multicast packet.

Step S380: The device that is in the destination subnet and that is connected to the core network forwards the multicast packet to which the bit string of the destination subnet is added.

In the embodiments of this disclosure, when the device that is in the source subnet and that is connected to the core network receives the multicast packet of the target multicast group, the addresses of devices that are in the plurality of destination subnets corresponding to the target multicast group and that are connected to the core network are determined, the multicast packet is replicated, to obtain the plurality of multicast packets whose quantity is equal to the quantity of the plurality of destination subnets, the outer encapsulation is separately added to each multicast packet, and the multicast packet to which the outer encapsulation is added is forwarded. The destination address in the outer encapsulation is the address of the device that is in each destination subnet and that is connected to the core network. In this way, when receiving the multicast packet, the device that is in the source subnet and that is connected to the core network replicates the multicast packet based on a quantity of destination subnets to which the multicast packet is to be sent, to avoid that a BFIR replicates a plurality of multicast packets when the multicast packet enters a data transmission network at the beginning. In this way, a quantity of multicast packets in a data transmission network can be greatly reduced, and occupation of network resources can be reduced.

Figure 6:
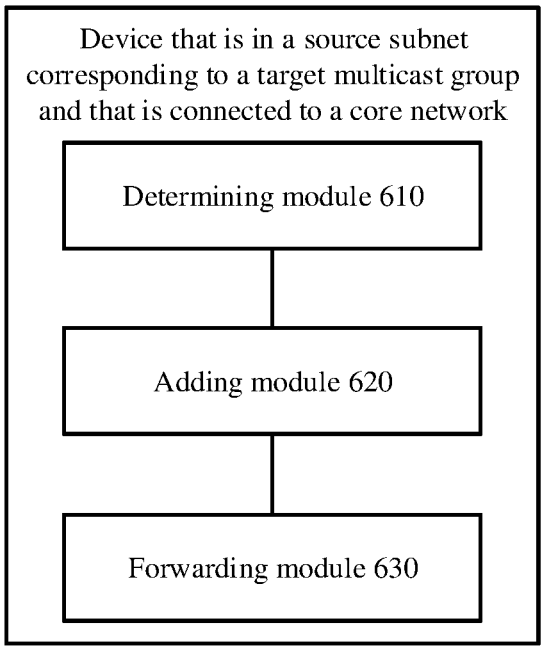
FIG. 6 is a schematic structural diagram of a device that is in a source subnet and that is connected to a core network according to an example embodiment.

An example embodiment of this disclosure provides a device that is in a source subnet corresponding to a target multicast group and that is connected to a core network. As shown in FIG. 6, the device includes a determining module 610, an adding module 620, and a forwarding module 630.

The determining module 610 is configured to: when a multicast packet of the target multicast group is received, determine addresses of devices that are in a plurality of destination subnets corresponding to the target multicast group and that are connected to the core network, and replicate the multicast packet, to obtain a plurality of multicast packets whose quantity is equal to a quantity of the plurality of destination subnets. Specifically, a determining function in the step S230 or the step S330 and another implicit step may be implemented.

The adding module 620 is configured to separately add outer encapsulation to each multicast packet, where a destination address in the outer encapsulation is an address of a device that is in each destination subnet and that is connected to the core network. Specifically, an adding function in the step S240 or the step S360 and another implicit step may be implemented.

The forwarding module 630 is configured to forward the multicast packet to which the outer encapsulation is added. Specifically, a forwarding function in the step S240 or the step S360 and another implicit step may be implemented.

Optionally, the determining module 610 is configured to: when the multicast packet of the target multicast group is received, determine, based on a preset correspondence between identification information of a destination subnet and an address of a device that is in the destination subnet and that is connected to the core network, and identification information, of the plurality of destination subnets, carried in a packet header of the multicast packet, the addresses of the devices that are in the corresponding plurality of destination subnets and that are connected to the core network.

Optionally, the determining module 610 is configured to: determine, based on a preset correspondence between a multicast address and an address of a device that is in a destination subnet and that is connected to the core network, addresses of devices that are in a plurality of destination subnets corresponding to the multicast address carried in a multicast packet and that are connected to the core network.

Optionally, the device further includes: a receiving module, configured to receive a TE bit string of each destination subnet sent by a controller, where the adding module is further configured to separately add the TE bit string of each destination subnet to a packet header of a corresponding multicast packet, to obtain the multicast packet corresponding to each destination subnet.

Optionally, the adding module 620 is configured to: separately replace a TE bit string, of the source subnet, in the packet header of the corresponding multicast packet with the TE bit string of each destination subnet, to obtain the multicast packet corresponding to each destination subnet.

It should be noted that the determining module 610, the adding module 620, and the forwarding module 630 may be implemented by a processor, or implemented by a processor in cooperation with a memory, or implemented by a processor by executing a program instruction in a memory.

Figure 7:
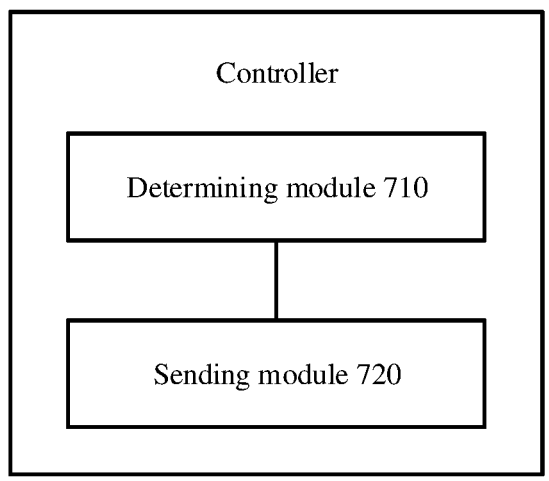
FIG. 7 is a schematic structural diagram of a controller according to an example embodiment.

An example embodiment of this disclosure provides a controller. As shown in FIG. 7, the controller includes a determining module 710 and a sending module 720.

The determining module 710 is configured to separately determine destination subnets to which a plurality of BFERs corresponding to a target multicast group belong, and separately determine a TE bit string of each destination subnet based on identification information of a device that is in each destination subnet and that is connected to the core network and identification information of a BFER in each destination subnet. Specifically, a determining function in the step S210 or the step S310 and another implicit step may be implemented.

The sending module 720 is configured to send the TE bit string of each destination subnet to a device that is in the corresponding destination subnet and that is connected to the core network, or a device that is in a source subnet corresponding to the target multicast group and that is connected to the core network. Specifically, a sending function in the step S220 or the step S320 and another implicit step may be implemented.

Optionally, the determining module 710 is further configured to determine a TE bit string of the source subnet based on identification information of a BFIR corresponding to the target multicast group and identification information of at least one device that is in the source subnet and that is connected to the core network.

The sending module 720 is further configured to send the TE bit string of the source subnet to the BFIR.

Optionally, when at least one BFER in the BFERs corresponding to the target multicast group belongs to the source subnet, the determining module 710 is configured to: determine the TE bit string of the source subnet based on the identification information of the BFIR corresponding to the target multicast group, the identification information of the at least one device that is in the source subnet and that is connected to the core network, and identification information of the at least one BFER.

Optionally, the sending module 720 is further configured to: send identification information of each destination subnet to the BFIR.

It should be noted that the determining module 710 and the sending module 720 may be implemented by a processor, or implemented by a processor in cooperation with a memory, or implemented by a processor by executing a program instruction in a memory.

Figure 8:
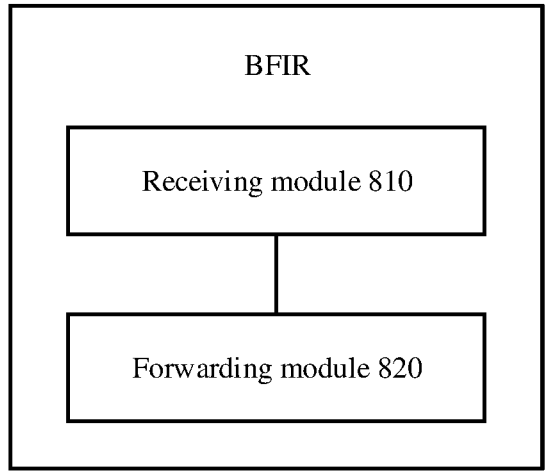
FIG. 8 is a schematic structural diagram of a BFIR according to an example embodiment.

An example embodiment of this disclosure provides a BFIR. As shown in FIG. 8, the BFIR includes a receiving module 810 and a forwarding module 820.

The receiving module 810 is configured to receive identification information, of each destination subnet corresponding to a target multicast group, sent by a controller. Specifically, a receiving function and another implicit step in the foregoing method embodiments may be implemented.

The forwarding module 820 is configured to: when a multicast packet of the target multicast group is received, add the identification information of each destination subnet to a packet header of the multicast packet, and forward, in a multicast manner, the multicast packet to which the identification information of each destination subnet is added. Specifically, a forwarding function and another implicit step in the foregoing method embodiments may be implemented.

Optionally, the receiving module 810 is further configured to receive a TE bit string, of a source subnet corresponding to the target multicast group, sent by the controller.

The forwarding module 820 is configured to: when the multicast packet of the target multicast group is received, add the TE bit string and the identification information of each destination subnet to the packet header of the multicast packet, and forward the multicast packet to which the TE bit string and the identification information of each destination subnet are added.

It should be noted that the receiving module 810 and the forwarding module 820 may be implemented by a processor, or implemented by a processor in cooperation with a memory, or implemented by a processor by executing a program instruction in a memory.

Figure 9:
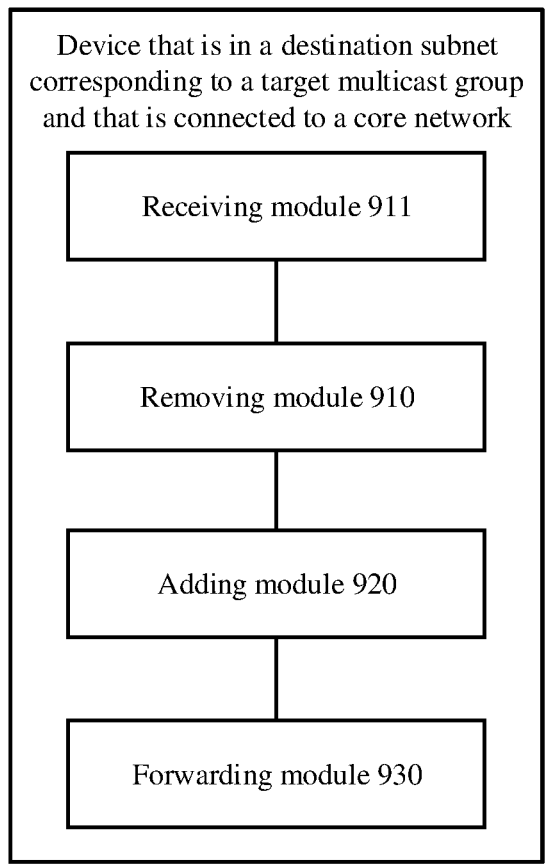
FIG. 9 is a schematic structural diagram of a device that is in a destination subnet and that is connected to a core network according to an example embodiment.

An example embodiment of this disclosure provides a device that is in a destination subnet corresponding to a target multicast group and that is connected to a core network. As shown in FIG. 9, the device includes a receiving module 911, a removing module 910, an adding module 920, and a forwarding module 930.

The receiving module 911 is configured to receive a multicast packet that is of the target multicast group and to which outer encapsulation is added. Specifically, a determining function in the step S250 or the step S370 and another implicit step may be implemented.

The removing module 910 is configured to: when a multicast packet that is of the target multicast group and to which outer encapsulation is added is received, remove the outer encapsulation to obtain the multicast packet. Specifically, a removing function in the step S250 or the step S370 and another implicit step may be implemented.

The adding module 920 is configured to add a bit string of the destination subnet to a packet header of the multicast packet. Specifically, an adding function in the step S260 and another implicit step may be implemented.

The forwarding module 930 is configured to forward the multicast packet to which the bit string of the destination subnet is added. Specifically, a forwarding function in the step S270 or the step S380 and another implicit step may be implemented.

Optionally, the bit string is a TE bit string, and the receiving module 911 is further configured to: receive the TE bit string, of the destination subnet, sent by a controller.

Optionally, the adding module 920 is configured to: replace a bit string, of a source subnet corresponding to the target multicast group, in the packet header of the multicast packet with the bit string of the destination subnet.

It should be noted that the receiving module 911, the removing module 910, the adding module 920, and the forwarding module 930 may be implemented by a processor, or implemented by a processor in cooperation with a memory, or implemented by a processor by executing a program instruction in a memory.

In the embodiments of this disclosure, when receiving the multicast packet, the device that is in the source subnet and that is connected to the core network replicates the multicast packet based on a quantity of destination subnets to which the multicast packet is to be sent, to avoid that a BFIR replicates a plurality of multicast packets when the multicast packet enters a data transmission network at the beginning. In this way, a quantity of multicast packets in a data transmission network can be greatly reduced, and occupation of network resources can be reduced.

It should be noted that when the device provided in the foregoing embodiment transmits the multicast packet, division of the foregoing function modules is merely an example. In actual implementation, the foregoing functions can be allocated to different modules and implemented as necessary. In other words, inner structures of devices are divided into different function modules to implement all or a part of the functions described above. In addition, the device provided in the foregoing embodiment pertains to a same concept as the embodiment of the method for transmitting a multicast packet. For a specific implementation process of the device, refer to the method embodiment. Details are not described herein again.

An example embodiment of this disclosure provides a system for transmitting a multicast packet, and the system includes a BFIR and a device that is in a source subnet corresponding to a target multicast group and that is connected to a core network.

The BFIR is configured to: when a multicast packet of the target multicast group is received, forward the multicast packet in a multicast manner.

The device that is in the source subnet and that is connected to the core network is configured to: when the multicast packet is received, determine addresses of devices that are in a plurality of destination subnets corresponding to the target multicast group and that are connected to the core network, replicate the multicast packet, to obtain a plurality of multicast packets whose quantity is equal to a quantity of the plurality of destination subnets, separately add outer encapsulation to each multicast packet, and forward the multicast packet to which the outer encapsulation is added, where a destination address in the outer encapsulation is an address of a device that is in each destination subnet and that is connected to the core network.

Optionally, the system further includes a controller.

The controller is configured to send identification information of each destination subnet corresponding to the target multicast group to the BFIR.

The BFIR is further configured to add the identification information of each destination subnet to a packet header of the multicast packet.

The device that is in the source subnet and that is connected to the core network is configured to: when the multicast packet is received, determine, based on a preset correspondence between identification information of a destination subnet and an address of a device that is in the destination subnet and that is connected to the core network, and identification information, of the plurality of destination subnets, carried in the packet header of the multicast packet, the addresses of the devices that are in the corresponding plurality of destination subnets and that are connected to the core network.

Optionally, the system further includes a device that is in the destination subnet corresponding to the target multicast group and that is connected to the core network.

The controller is further configured to: separately determine destination subnets to which a plurality of BFERs corresponding to the target multicast group belong; separately determine a bit string of each destination subnet based on identification information of the device that is in each destination subnet and that is connected to the core network and identification information of a BFER in each destination subnet; and send the bit string of each destination subnet to the device that is in the corresponding destination subnet and that is connected to the core network.

The device that is in the destination subnet and that is connected to the core network is configured to: when the multicast packet to which the outer layer encapsulation is added is received, remove the outer layer encapsulation to obtain the multicast packet; add the bit string of the destination subnet to the packet header of the multicast packet; and forward the multicast packet to which the bit string of the destination subnet is added.

Optionally, the controller is further configured to determine a bit string of the source subnet based on identification information of a BFIR corresponding to the target multicast group and identification information of at least one device that is in the source subnet and that is connected to the core network, and send the bit string of the source subnet to the BFIR.

The BFIR is further configured to: receive the bit string, of the source subnet, sent by the controller; when the multicast packet is received, add the bit string of the source subnet and the identification information of each destination subnet to the packet header of the multicast packet; and forward the multicast packet to which the bit string of the source subnet and the identification information of each destination subnet are added.

For the system in the foregoing embodiment, a specific manner of performing an operation by each device has been described in detail in the embodiment related to the method. Details are not described herein again.

A person skilled in the art can easily figure out another implementation solution of the disclosure after considering the specification and practicing the disclosure that is disclosed herein. This application is intended to cover any variations, functions, or adaptive changes of the disclosure. These variations, functions, or adaptive changes comply with general principles of the disclosure, and include common knowledge or a commonly used technical means in the technical field that is not disclosed in the disclosure. The specification and the embodiments are merely considered as examples, and the actual scope and the spirit of the disclosure are pointed out by the following claims.

It should be understood that this disclosure is not limited to the accurate structures that are described in the foregoing and that are shown in the accompanying drawings, and modifications and changes may be made without departing from the scope of the disclosure. The scope of the disclosure is limited only by the appended claims.

What is claimed is:

1. A method, comprising:
when a multicast packet of a target multicast group is received, determining, by a first device, addresses of devices that are in a plurality of destination subnets corresponding to the target multicast group and that are connected to a core network, and replicating the multicast packet to obtain a plurality of multicast packets whose quantity is equal to a quantity of the plurality of destination subnets, wherein the first device is comprised in a source subnet corresponding the target multicast group, and the first device is connected to the core network; and
for each multicast packet of the plurality of multicast packets, separately adding outer encapsulation to the respective multicast packet, and forwarding the respective multicast packet, wherein a destination address in the outer encapsulation is an address of a device that is in a destination subnet of the plurality of destination subnets and that is connected to the core network; and
wherein determining the addresses of the devices that are in the plurality of destination subnets corresponding to the target multicast group and that are connected to the core network comprises:
determining, based on a preset correspondence between first information and second information, the addresses of the devices that are in the plurality of destination subnets corresponding to the target multicast group and that are connected to the core network, wherein the first information is identification information of the plurality of destination subnets, and the second information is addresses of the devices that are in the plurality of destination subnets and that are connected to the core network.

2. The method according to claim 1, wherein before separately adding outer encapsulation to each respective multicast packet, the method further comprises:

receiving a traffic engineering (TE) bit string of each destination subnet of the plurality of destination subnets sent by a controller; and for each multicast packet of the plurality of multicast packets, separately adding the TE bit string of a destination subnet corresponding to the respective multicast packet to a packet header of the respective multicast packet, to obtain the respective multicast packet.

3. The method according to claim 2, wherein for each multicast packet of the plurality of multicast packets, separately adding the TE bit string of the destination subnet corresponding to the respective multicast packet to the packet header of the respective multicast packet, to obtain the respective multicast packet, comprises:

for each multicast packet of the plurality of multicast packets, separately replacing a TE bit string of the source subnet in the packet header of the respective multicast packet with the TE bit string of the destination subnet corresponding to the respective multicast packet, to obtain the respective multicast packet.

4. A first device, comprising:
a processor; and
a non-transitory computer readable medium which storing computer-executable instructions;
wherein the processor is configured to execute the computer-executable instructions to enable the first device to perform operations comprising:
when a multicast packet of a target multicast group is received, determining addresses of devices that are in a plurality of destination subnets corresponding to the target multicast group and that are connected to a core network, and replicating the multicast packet to obtain a plurality of multicast packets whose quantity is equal to a quantity of the plurality of destination subnets, wherein the first device is comprised in a source subnet corresponding the target multicast group, and the first device is connected to the core network; and
for each multicast packet of the plurality of multicast packets, separately adding outer encapsulation to the respective multicast packet, and forwarding the respective multicast packet, wherein a destination address in the outer encapsulation is an address of a device that is in a destination subnet of the plurality of destination subnets and that is connected to the core network; and
wherein determining the addresses of the devices that are in the plurality of destination subnets corresponding to the target multicast group and that are connected to the core network comprises:
determining, based on a preset correspondence between first information and second information, the addresses of the devices that are in the plurality of destination subnets corresponding to the target multicast group and that are connected to the core network, wherein the first information is identification information of the plurality of destination subnets, and the second information is addresses of the devices that are in the plurality of destination subnets and that are connected to the core network.

5. The method according to claim 1, wherein the source subnet comprises a bit forwarding ingress router (BFIR).

6. The first device according to claim 4, wherein the processor is further configured to execute the computer-executable instructions to enable the first device to perform operations comprising:

receiving a traffic engineering (TE) bit string of each destination subnet sent by a controller; and for each multicast packet of the plurality of multicast packets, separately adding the TE bit string of a destination subnet corresponding to the respective multicast packet to a packet header of the respective multicast packet, to obtain the respective multicast packet.

7. The first device according to claim 6, wherein for each multicast packet of the plurality of multicast packets, separately adding the TE bit string of the destination subnet corresponding to the respective multicast packet to the packet header of the respective multicast packet, to obtain the respective multicast packet, comprises:

for each multicast packet of the plurality of multicast packets, separately replacing a TE bit string of the source subnet in the packet header of the respective multicast packet with the TE bit string of the destination subnet corresponding to the respective multicast packet, to obtain the respective multicast packet.

8. The first device according to claim 4, wherein the source subnet comprises a bit forwarding ingress router (BFIR).

9. A non-transitory memory storing a executable program, the program including instructions to cause a first device to:
when a multicast packet of a target multicast group is received, determine addresses of devices that are in a plurality of destination subnets corresponding to the target multicast group and that are connected to a core network, and replicate the multicast packet to obtain a plurality of multicast packets whose quantity is equal to a quantity of the plurality of destination subnets, wherein a first device to which the program is configured to be applied is comprised in a source subnet corresponding the target multicast group, and the first device is connected to the core network; and
for each multicast packet of the plurality of multicast packets, separately add outer encapsulation to the respective multicast packet, and forward the respective multicast packet, wherein a destination address in the outer encapsulation is an address of a device that is in a destination subnet of the plurality of destination subnets and that is connected to the core network; and
wherein determining the addresses of the devices that are in the plurality of destination subnets corresponding to the target multicast group and that are connected to the core network comprises:
determining, based on a preset correspondence between first information and second information, the addresses of the devices that are in the plurality of destination subnets corresponding to the target multicast group and that are connected to the core network, wherein the first information is identification information of the plurality of destination subnets, and the second information is addresses of the devices that are in the plurality of destination subnets and that are connected to the core network.

10. The non-transitory memory according to claim 9, wherein the program includes instructions to further cause the first device to:

receive a traffic engineering (TE) bit string of each destination subnet sent by a controller; and for each multicast packet of the plurality of multicast packets, separately add the TE bit string of a destination subnet corresponding to the respective multicast packet to a packet header of the respective multicast packet, to obtain the respective multicast packet.

11. The non-transitory memory according to claim 10, wherein for each multicast packet of the plurality of multicast packets, separately adding the TE bit string of the destination subnet corresponding to the respective multicast packet to the packet header of the respective multicast packet, to obtain the respective multicast packet, comprises:

for each multicast packet of the plurality of multicast packets, separately replacing a TE bit string of the source subnet in the packet header of the respective multicast packet with the TE bit string of the destination subnet corresponding to the respective multicast packet, to obtain the respective multicast packet.

12. The non-transitory memory according to claim 9, wherein the source subnet comprises a bit forwarding ingress router (BFIR).

13. The non-transitory memory according to claim 12, wherein the BFIR is connected to a source customer edge device, and the source customer edge device is connected to a source device that generates the multicast packet.

14. The non-transitory memory according to claim 13, wherein the source device is a media server.

15. The non-transitory memory according to claim 13, wherein the BFIR forwards the multicast packet without replicating the multicast packet.

16. The non-transitory memory according to claim 13, wherein the quantity of the plurality of destination subnets is determined based on identification information of the plurality of destination subnets that is added to a packet header of the multicast packet by the BFIR.

17. The first device according to claim 8, wherein the BFIR is connected to a source customer edge device, and the source customer edge device is connected to a source device that generates the multicast packet.

18. The first device according to claim 17, wherein the source device is a media server.

19. The source device according to claim 17, wherein the BFIR forwards the multicast packet without replicating the multicast packet.

20. The method according to claim 5, wherein the BFIR is connected to a source customer edge device, and the source customer edge device is connected to a source device that generates the multicast packet.

* * * * *

UNITED STATES PATENT AND TRADEMARK OFFICE
CERTIFICATE OF CORRECTION

PATENT NO. : 11,736,411 B2
APPLICATION NO. : 17/033100
DATED : August 22, 2023
INVENTOR(S) : Xia et al.

It is certified that error appears in the above-identified patent and that said Letters Patent is hereby corrected as shown below:

In the Claims

In Column 32, in Claim 19, Line 15, delete "source" and insert -- first --.

Signed and Sealed this
Twenty-fourth Day of October, 2023

Katherine Kelly Vidal
*Director of the United States Patent and Trademark Office*